United States Patent
Freitas

(10) Patent No.: US 10,225,331 B1
(45) Date of Patent: Mar. 5, 2019

(54) NETWORK ADDRESS TRANSLATION LOAD BALANCING OVER MULTIPLE INTERNET PROTOCOL ADDRESSES

(71) Applicant: EMC IP Holding Company LLC, Hopkinton, MA (US)

(72) Inventor: Ornat S Freitas, Raleigh, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 482 days.

(21) Appl. No.: 14/979,453

(22) Filed: Dec. 27, 2015

Related U.S. Application Data

(60) Provisional application No. 62/222,651, filed on Sep. 23, 2015.

(51) Int. Cl.
*H04L 29/08* (2006.01)
*H04L 29/12* (2006.01)
(Continued)

(52) U.S. Cl.
CPC ........ *H04L 67/1002* (2013.01); *H04L 45/245* (2013.01); *H04L 61/2007* (2013.01);
(Continued)

(58) Field of Classification Search
CPC ........ H04L 5/00–5/0001; H04L 5/0028; H04L 5/003; H04L 5/0044; H04L 5/0058; H04L 5/0075; H04L 29/00–29/04; H04L 29/10; H04L 45/00; H04L 45/24; H04L 45/245; H04L 47/00; H04L 47/10; H04L 61/00; H04L 61/15–61/1511; H04L 61/20; H04L 61/2007; H04L 61/2061; H04L 67/00;
(Continued)

(56) References Cited

U.S. PATENT DOCUMENTS 6,012,090 A * 1/2000 Chung .................... H04L 67/02
709/218
6,161,139 A * 12/2000 Win ....................... G06F 21/604
709/223

(Continued)

OTHER PUBLICATIONS

IOS NAT Load-Balancing for Two ISP Connections—Cisco—Feb. 22, 2008.*

(Continued)

*Primary Examiner* — Tauqir Hussain
*Assistant Examiner* — Boris D Grijalva Lobos
(74) *Attorney, Agent, or Firm* — Staniford Tomita LLP

(57) ABSTRACT

Embodiments for a method of providing load balancing over multiple network addresses across an network address translation (NAT) network including a data storage system, that defines an interface group identifying a private network for one or more clients to communicate with a host for read/write operations, configuring, in the server, pre-NAT IP (Internet Protocol) addresses for the one or more clients and adding them to the interface group, upon receiving a client hostname, returning an interface group an IP address to the client that it can use it for a data transfer operation to the data storage system, and incrementing the pre-NAT addresses after the client starts the data transfer operation such that the least used address in the interface group is always selected for the client so as to maintain load-balance across the plurality of clients.

11 Claims, 22 Drawing Sheets

(51) Int. Cl.
*G06F 15/16* (2006.01)
*H04L 12/709* (2013.01)

(52) U.S. Cl.
CPC .......... *H04L 61/2061* (2013.01); *H04L 67/10* (2013.01); *H04L 67/1095* (2013.01)

(58) Field of Classification Search
CPC .. H04L 67/10; H04L 67/1095; H04L 67/1097
See application file for complete search history.

(56) References Cited

U.S. PATENT DOCUMENTS

| | | | | |
|---|---|---|---|---|
| 6,272,523 | B1 * | 8/2001 | Factor | G06F 9/505 707/999.01 |
| 6,591,272 | B1 * | 7/2003 | Williams | G06F 17/30607 |
| 6,741,592 | B1 * | 5/2004 | Edsall | H04L 12/4641 370/389 |
| 7,320,027 | B1 * | 1/2008 | Chang | H04L 29/12377 709/219 |
| 7,469,295 | B1 * | 12/2008 | Gangadharan | H04L 69/326 709/232 |
| 7,653,700 | B1 * | 1/2010 | Bahl | H04L 29/12009 709/216 |
| 8,180,929 | B2 * | 5/2012 | Hong | H04N 21/43615 710/3 |
| 8,285,141 | B1 * | 10/2012 | Crowe | H04J 14/0256 398/45 |
| 8,554,929 | B1 * | 10/2013 | Szeto | H04L 67/1002 709/228 |
| 8,788,640 | B1 * | 7/2014 | Masters | H04L 45/123 370/232 |
| 9,270,580 | B1 * | 2/2016 | Abraham | H04L 45/22 |
| 9,344,493 | B1 * | 5/2016 | Anand | H04L 67/2861 |
| 9,647,952 | B2 * | 5/2017 | Williams | H04L 47/38 |
| 2001/0047415 | A1 * | 11/2001 | Skene | H04L 29/06 709/226 |
| 2003/0061533 | A1 * | 3/2003 | Perloff | H04L 1/22 714/4.3 |
| 2003/0154307 | A1 * | 8/2003 | Puthiyandyil | H04L 29/12009 709/245 |
| 2003/0200477 | A1 * | 10/2003 | Ayres | G06F 13/102 714/2 |
| 2004/0039723 | A1 * | 2/2004 | Lee | G06Q 30/02 |
| 2004/0078487 | A1 * | 4/2004 | Cernohous | H04L 29/12009 709/245 |
| 2004/0260755 | A1 * | 12/2004 | Bardzil | H04L 41/12 709/200 |
| 2006/0015596 | A1 * | 1/2006 | Mar | H04L 29/1232 709/222 |
| 2006/0215654 | A1 * | 9/2006 | Sivakumar | H04L 29/12415 370/389 |
| 2010/0036954 | A1 * | 2/2010 | Sakata | H04L 12/6418 709/226 |
| 2010/0057929 | A1 * | 3/2010 | Merat | H04L 29/12462 709/231 |
| 2013/0170344 | A1 * | 7/2013 | Crowe | H04L 47/72 370/230 |
| 2013/0304927 | A1 * | 11/2013 | Abu-Amara | H04L 61/1511 709/227 |
| 2014/0059205 | A1 * | 2/2014 | Mohammed | H04L 67/2814 709/224 |
| 2014/0092738 | A1 * | 4/2014 | Grandhi | H04L 47/52 370/235 |
| 2014/0161449 | A1 * | 6/2014 | Doerr | H04J 14/0257 398/49 |
| 2015/0131542 | A1 * | 5/2015 | Amini | H04W 88/08 370/329 |
| 2017/0250869 | A1 * | 8/2017 | Voellmy | H04L 41/0893 |

OTHER PUBLICATIONS

Anonymous et al. ([EMC-DataProtection-L] Data Domain and multiple NICs—Nov. 25, 2013).*
Burton—What is Data Domain Boost and what is it used for—techtarget.com—Nov. 2014.*
Causer (Linux and eduroam _ link aggregation with LACP bonding—Network Development Team—Jul. 31, 2014).*
EMC2—Data Domain Boost for OpenStorage Administration Guide—May 4, 2012.*
Fortinet—The ABCs of ADCs—2014.*
How does NAT-based load balancing work—SortByte—Aug. 21, 2015.*

* cited by examiner

Ideal WAN Network

LAN Network

All ddboost ifgroup -> move to new ifgroup CLIs
Deprecate ddboost ifgroup CLIs
Modify CLIs to add replication ifgroup add replication <group_name>
    {mtree <mtree-path> | remote <hostname> |
    mtree <mtree-path> remote <hostname>} ifgroup show config [<group-name>] {all | summary |
    interfaces | clients | replication} ifgroup reset config [<group-name>] {all | interfaces
    clients | replication}

FIG. 16

Example:
ifgroup add replication mtree /data/col1/REPLX remote ddp-880-1.datadomain.com 10GLab
Added replication mtree="/data/col1/REPLX" with remote="ddp-880-1.datadomain.com" to ifgroup "10GLab".

ifgroup show config replication 10GLab
Group-name    Status     Replication              Replication
                         Mtree                    Remote Host
----------    -------    --------------------     -----------------------
10GLab        enabled    /data/col1/REPLX         ddp-880-1.datadomain.com
----------    -------    --------------------     ----------------------- sysadmin@ddp-880-2# ifgroup show connections
Group-name  Status   Port    Interface         Client Write  Client Read  Repl-out  Repl-in  Total
----------  -------  ------  ---------------   ------------  -----------  --------  -------  -----
(null)      disable  eth0a   10.6.109.41
default     enabled  eth0a   10.6.109.40             0            0          0         0       0
10GLab      enabled  eth4a:1 192.168.1.230           0            0          0         0       0
10GLab      enabled  eth4b:1 192.168.1.231           0            0          0         0       0
----------  -------  ------  ---------------   ------------  -----------  --------  -------  ----- sysadmin@ddp-880-2# ifgroup show connections
Group-name  Status   Port    Interface         Client Write  Client Read  Repl-out  Repl-in  Total
----------  -------  ------  ---------------   ------------  -----------  --------  -------  -----
(null)      disable  eth0a   2620::eaf4
default     disable  eth0b   2620::eaf5              0            0          0         0       0
10GLab      disable  eth4a   3000::230               0            0          0         0       0
10GLab      disable  eth4b   3000::231               0            0          0         0       0
----------  -------  ------  ---------------   ------------  -----------  --------  -------  -----

FIG. 17

```
ddboost show connections
```

| | ifgroup | | | | Client Connections | | | | DD Connections | | |
|---|---|---|---|---|---|---|---|---|---|---|---|
| | | | | | | Control | | | | Data | |
| Group-name | Status | Interface | Write | Read | Src-repl | Dst-repl | Synthetic | | Repl-out | Repl-in | Total |
| none | | 10.6.109.41 | 0 | 0 | 0 | 0 | 0 | | 0 | 0 | 0 |
| default | enabled | 10.6.109.40 | 0 | 0 | 0 | 0 | 0 | | 0 | 0 | 0 |
| 10GLab | enabled | 192.168.1.230 | 0 | 0 | 0 | 0 | 0 | | 0 | 0 | 0 |
| 10GLab | enabled | 192.168.1.231 | 0 | 0 | 0 | 0 | 0 | | 0 | 0 | 0 |
| only1G | enabled | 10.6.109.244 | 0 | 0 | 0 | 0 | 0 | | 0 | 0 | 0 |
| only1G | enabled | 10.6.109.144 | 0 | 0 | 0 | 0 | 0 | | 0 | 0 | 0 |
| only1G | enabled | 10.6.109.145 | 0 | 0 | 0 | 0 | 0 | | 0 | 0 | 0 |
| only1G | enabled | 10.6.109.146 | 0 | 0 | 0 | 0 | 0 | | 0 | 0 | 0 |
| Total Connections: | | | 0 | 0 | 0 | 0 | 0 | | 0 | 0 | 0 |

FIG. 18

```
Max Client Connections: 180
----------- ifgroup -----------   ------------------- Client Connections -------------------   - DD Connections -
                                                     ----- Control -----                      ------ Data ------
Group-name  Status   Interface    Write   Read   Src-repl  Dst-repl   Synthetic   Repl-out  Repl-in   Total
none                              0       0      0         0          0           0         0         0
default                           0       0      0         0          0           0         0         0
10GLab               2620::eaf4   0       0      0         0          0           0         0         0
10GLab               2620::eaf5   0       0      0         0          0           0         0         0
only1G               3000::230    0       0      0         0          0           0         0         0
only1G               3000::231    0       0      0         0          0           0         0         0
only1G               2620::e628   0       0      0         0          0           0         0         0
only1G               2620::e629   0       0      0         0          0           0         0         0
                     2620::e62c
                     2620::e62d
-------------------------------
         Total Connections:       0       0      0         0          0           0         0         0
-------------------------------
```

FIG. 19

NETWORK ADDRESS TRANSLATION LOAD BALANCING OVER MULTIPLE INTERNET PROTOCOL ADDRESSES

CROSS-REFERENCE TO RELATED APPLICATIONS

This patent application is claims priority to U.S. Provisional Patent Application Ser. No. 62/222,651 entitled "Multi-Path Distribution, Load Balancing and Failover Interface Groups," filed on Sep. 23, 2015.

TECHNICAL FIELD

Embodiments are generally directed to link aggregation, and more specifically to link aggregation in a networked-based data backup system.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Network backup systems process vast amounts of data between computers and storage devices often in parallel streams of data. One of the biggest challenges for ingesting multiple data streams into a backup storage system is to distribute those streams across multiple network interfaces for good performance. Link aggregation is a computer networking technique for combining or aggregating multiple network connections in parallel in order to increase throughput beyond what a single connection can sustain, and to provide redundancy in case one of the links should fail. A link aggregation group combines a number of physical ports together to make a single high-bandwidth data path, providing load sharing of data traffic among ports and improving connection reliability. The Link Aggregation Control Protocol (LACP) as defined in IEEE 802.3ad provides a method to control the bundling of several physical ports together to form a single logical channel. LACP, however, poses certain challenges. For example, it can be very difficult to install and maintain, it does not always deliver the full bandwidth of all interfaces, any changes require taking interfaces offline for configuration, and it is very sensitive to network errors. An additional disadvantage of LACP is that it is limited to only one IP (Internet Protocol) address. This requires a tedious configuration operation at every network hop.

Another mechanism to accommodate the ever increasing amounts of data and number network nodes is Network Address Translation (NAT), which is a methodology that remaps one IP address space into another by modifying network address information in IP datagram packet headers while they are in transit across a router. This mechanism has become important in conserving global address space allocations in the face of address exhaustion concerns. NAT allows a single device to act as an agent between the Internet and a local network, so that only a single, unique IP address is required to represent an entire group of computers. In this manner, an entire network (e.g., wide or local area network) can be mapped to a single IP address.

To optimize network performance, load balancing techniques are often used to balance client connections over multiple server interfaces that exist within a a NAT environment. For example, certain interface grouping methods have been developed to perform IP redirects, load balancing and fail-over to provide this functionality over across NAT networks.

However, present load balancing solutions are not necessarily compatible or at least optimal with LACP networks. This is because only one IP address is used with LACP and this requires tedious configuration operations at each network hop or node.

Therefore, there is generally a need for improved systems and techniques of link aggregation especially in relation to load balancing and failover operations in a networked-based data backup system. There is a further need for providing load balancing over multiple IP addresses across a NAT network with a simple configuration procedure.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of EMC Corporation.

Multi-Path distribution, load balancing and failover for interface groups is hereafter referred to as the ifgroup method, where "ifgroup" may refer to an interface group.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 16 shows an example of a configuration modification according to a specific embodiment.

FIG. 17 shows another example of a configuration modification according to a specific embodiment.

FIG. 18 shows an example of interface usage that may be viewed according to a specific embodiment.

FIG. 19 shows another example of interface usage that may be viewed according to a specific embodiment.

DETAILED DESCRIPTION

Figure 1:
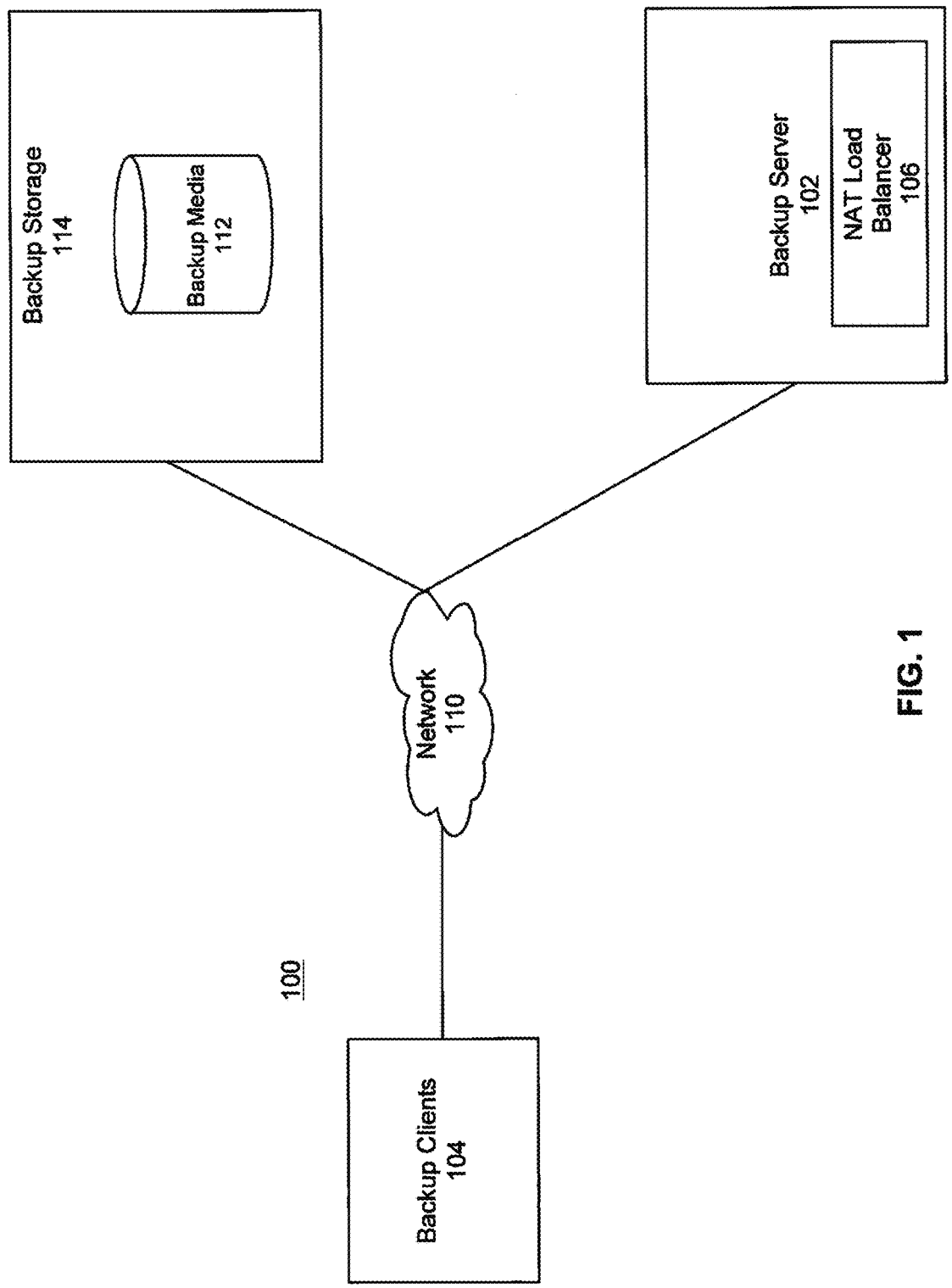
FIG. 1 is a diagram of a large-scale network implementing a network-based data backup system in which ifgroup and NAT load balancing over multiple IP addresses may be implemented, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems utilizing certain link aggregation techniques. In a specific embodiment, link aggregation is used to facilitate load balancing and fail over in a network. In a specific embodiment, the methods and systems for link aggregation are used in conjunction with a backup application program or system. The network may be a network that uses NAT (network address translation) to map network node addresses to a single IP address. The backup application can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for link aggregation and NAT load balancing over multiple IP addresses. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media 112 of a backup storage node 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup storage node 114. A backup client executes processes for backing up data to the storage node, restoring the backed up data, and coordinating with backup server processes on the backup server and processes on the storage node. The backup server processes include processes to index the backups and identify which savesets reside on which backup devices or volumes. The backup storage node executes processes for receiving backup information from the backup client, writing data to the backup devices or volumes, sending tracking information to the backup server to track the data written to the devices or volumes, and reading the data from the devices or volumes at the request of the client during a recovery.

In an embodiment, system 100 may represent a Data Domain Replicator (DDR)-based deduplication storage system, and a storage server or node having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as replication for disaster recovery or extended retention or DD Boost provided by EMC Corporation. In general, DD Boost. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

As shown in FIG. 1 backup server 102 also executes as part of a backup management process, a NAT load balancing process 106. The backup management process uses ifgroup to perform IP redirect, load balancing and failover operations. The NAT load balancing process 106 provides certain mechanisms to provide this same functionality across NAT networks. In an embodiment, process 106 uses a simple alias network configuration on the server 102 and a proprietary field that is added to a backup message (e.g., Data Domain message) from a client or clients 104 to the server. The client can be a backup client or a source DDR (Data Domain Replicator) client performing file replication to target DDR. This allows load balancing to be performed over multiple IP addresses across the network with a simple configuration that consists of creating an alias IP address and adding it to the ifgroup definitions.

Ifgroup and Link Aggregation

Computing devices are interconnected by communication links for transmitting and receiving data packets through physical ports. One of the biggest challenges for ingesting hundreds of streams into a storage system such as the Data Domain system is to distribute those streams across multiple network interfaces for optimum or good performance. However, backup application clients may access the storage system through one host-name or IP address, creating a bottleneck due to the single IP connectivity. In a specific embodiment, a process in conjunction with ifgroup provides dynamic load balancing and redundancy for failover recovery while delivering full network bandwidth capacity and maintaining data-path (VLAN or virtual LAN) isolation. In a specific embodiment, the process may be incorporated into a system referred to as Data Domain Boost as provided by EMC Corporation.

In a specific embodiment, the interface group (which may be referred to as ifgroup) mechanism distributes backup-application client connections across available links on the storage system while maintaining data-path (VLAN) isolation. When an error is encountered on a link, the ifgroup configuration initiates a fail-over to another link within the isolated VLAN. The ifgroup solution has no additional overhead on the stream of data to the storage system; therefore, ifgroup provide better performance and easier configuration compared to Link Aggregation Control Protocol (LACP). Such a function may be provided within or as part of the load balancer process 106 shown in FIG. 1 and can be applied to certain LACP implementations.

Figure 2:
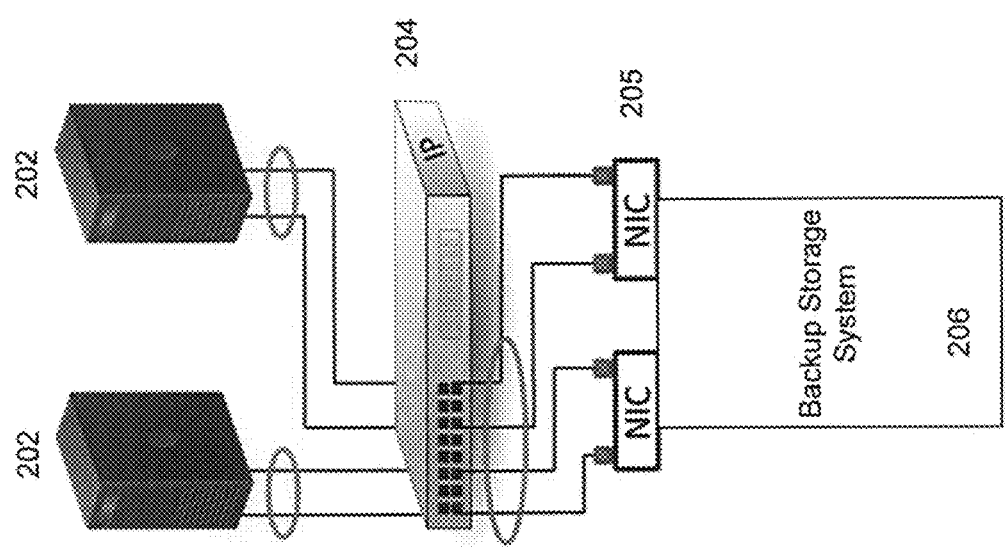
FIG. 2 illustrates an LACP system that may be used with a a NAT load balancing process, under some embodiments.

FIG. 2 illustrates an LACP system that may be used with a NAT load balancing process, under some embodiments. In general, LACP is one method of bundling several physical interfaces into one logical interface. LACP is defined in IEEE 802.3ad and is an open standard and should be used in a mixed vendor environment. However, it is a point-to-point protocol, not an end to end protocol. LACP works in layer 2/3 of the Network stack. One issue, as stated above, is that only one IP address is used with LACP, resulting in a tedious configuration operation at every network node. As shown in FIG. 2, LACP point 204 provides link aggregation between storage devices 202 and NIC switches 205 that are coupled to a server running a backup storage system 206.

Figure 3:
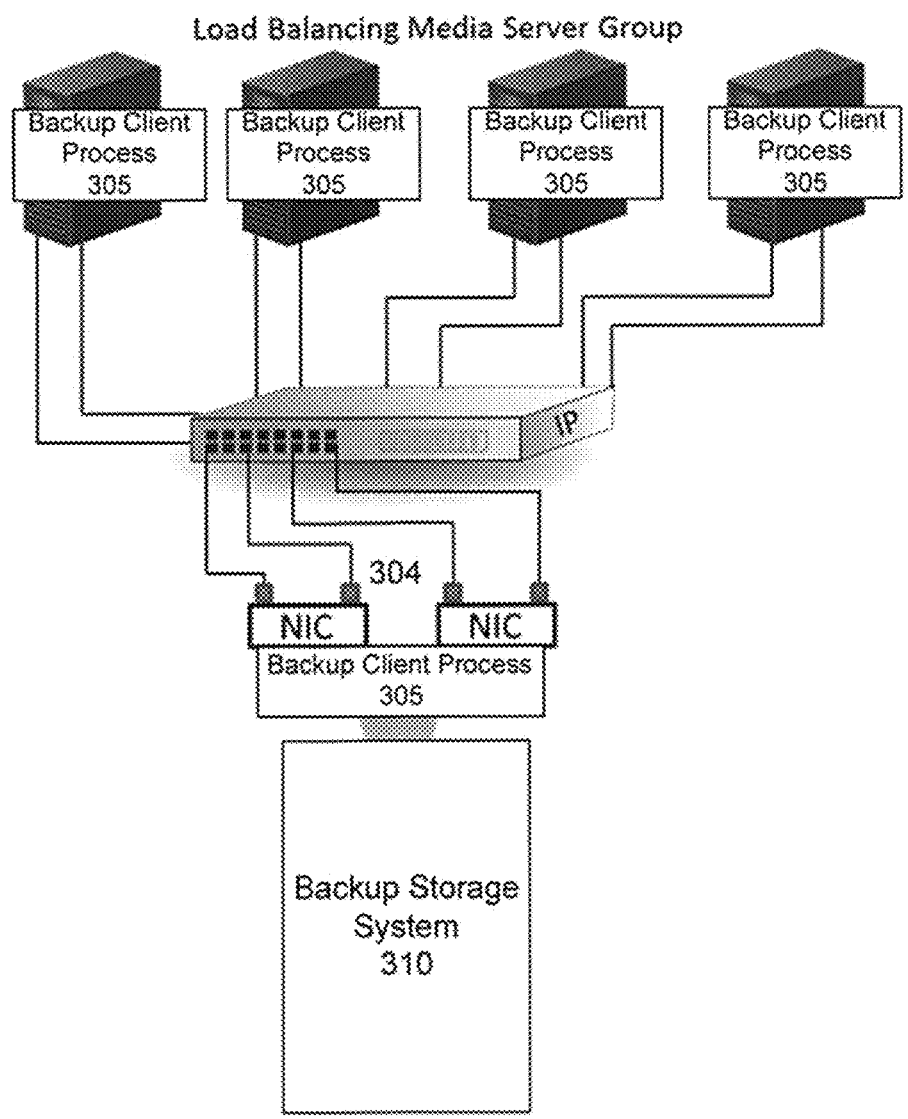
FIG. 3 shows a block diagram of link aggregation using an interface group (ifgroup) according to a specific embodiment.

To overcome some of the disadvantages of the point-to-point nature of LACP, ifgroup is implemented in the application layer so that the overall transmission between the storage and switches is an end-to-end protocol. FIG. 3 illustrates using link aggregation in a ifgroup system, under some embodiments. This mechanism generally features better performance due to less overhead in doing health check operations, etc. In a specific embodiment, ifgroup may be provided as part of an API (e.g., DD Boost API) and provides for efficient load balancing and failover plus many advanced features not available with LACP.

FIG. 3 illustrates an example in which the ifgroup 304 comprises four ports in the group. Since backup-application clients continue to access the storage system through a single host-name or IP address (as per NAT), the ifgroup mechanism utilizes client software 305 in conjunction with backup storage system 310 to manage the network connections. The client software may be referred to as DD Boost and the backup storage system may be referred to as Data Domain. Backup-applications connect to the backup storage system prior to initiating the "backup image" or "restore image" operations. These images may vary from multiple megabytes to terabytes. Load balancing is established at the start of the operation with network disconnect/reconnect to select the best or appropriate network interface for the particular client. Once backup-application operations are in progress, there is no additional overhead. Unlike LACP, there are no additional health check messages to consume usable interface bandwidth. This means that ifgroup can be up to 60 percent more efficient.

With respect to error handling, network errors are usually a combination of physical errors, such as a failed network switch, and transient errors, such as congestion errors. the LACP is equipped to handle physical errors, but not transient errors at the TCP layer of the network. The ifgroup mechanism is designed to handle both types of errors, and is especially effective for transient errors, where a network can reconnect on the same interface to clear transient congestion. The client protocol or logic takes advantage of the ifgroup failover ability; the client side protocol detects an unresponsive connection and initiates failover to reconnect to an IP provided by the backup storage system.

In a specific embodiment, all ifgroup configurations are localized to the backup storage system, unlike LACP where additional configuration is required on the network switch to associate network interfaces into Ether Channels. The backup storage system is responsible for selecting the load balancing and failover IP for each backup-application client. The ifgroup feature set handles a wide variation of customer's networks with:

1) WAN—single physical interface that is used by backup-application to connect to a backup storage system.

2) LAN—multiple physical interfaces that can be used to distribute send or receive data including failover between these interfaces.

3) Multi-speed network—mixed physical interfaces with different network speed (e.g., 1G and 10G) where each backup-application client may be able to connect to a single speed or multiple speeds.

VLAN—data-path isolation through virtual interfaces where backup-application client is limited to accessing specific virtual interfaces.

NAT—Client connection across NAT support load balancing over multiple backup storage system private IP addresses.

In an embodiment, the backup server 102 of FIG. 1 extends the ifgroup model to provide LACP load balancing over NAT networks. Specifically, as described in further detail below, it uses a configuration consisting of an alias IP that is added to the ifgroup so that a simple alias network configuration is created on the server through a unique field added to the client to server backup messages. Thus, with respect to the networks listed above, the NAT implementation is most salient. An ifgroup for NAT is established by configuring the pre-translated IP address of the backup storage system (e.g., Data Domain system) against the physical port of the translated IP, creating a new group. Clients that need to access via NAT are configured to use the ifgroup with the pre-translated IP addresses.

From a network connectivity perspective, VLAN tagged interfaces and different interfaces such as 1G and 10G, are similar in that they both result in client not being able to connect to a given IP address. Therefore, the ifgroup mechanism for these two unrelated problems is solved with the backup-application client "Group" association.

The configuration of ifgroup associates a list of IP addresses with a list of backup-application clients in a group. In a specific embodiment, there are two underlying rules for a ifgroup: first, all the clients must be able to connect to every IP address within the group; second, every IP address within the group is on a unique physical interface, to ensure failover recovery. These two rules ensure that a backup-application client can load balance against all interfaces within the group and can fail-over recover to any interface within its associated group. It is important to note that 10G interface and 1G interface are treated equally in the load balancing decision. Operations that start on the 10G interface will complete sooner, allowing the next operation to re-use the interface, therefore there is no advantage in assigning weights to the interface bandwidth capacity for load balancing assignment. However, the decision to combine 10G interface and 1G interface within the same ifgroup requires that each of the clients be able to communicate with both 10G and 1G. Each physical interface may exist as a virtual interface within a ifgroup. This allows multiple VLANs to utilize the same physical ports while maintaining data-path isolation. A typical network environment can also be gradually updated from 1G to 10G and move backup-application clients from ifgroup containing 1G interfaces to ifgroup containing 10G interfaces.

Unlike LACP, which requires taking interfaces offline for configuration, ifgroup configuration can be done at any time without impacting network traffic and availability. Adding ifgroup with additional VLAN interfaces or adding backup-application clients to ifgroup does not impact any in progress operations. Newly made configuration changes are effective at the start of the next backup-application operation. For example, if an additional interface is added to an ifgroup, it will be available for load balancing at the start of next backup-application "backup image" or "restore image."

In a specific embodiment, the use cases for ifgroup include replication. Ifgroup provides customers with a tool to increase replication performance (2 links) and reliability (failover) which is particularly attractive in situations where networks are unreliable. In a specific embodiment, ifgroup is supported for file replication. In a specific embodiment, file replication may be referred to as Managed File Replication (MFR) as provided by EMC Corporation.

Both the source and destination backup storage systems are involved in load balancing and failover selection of the local interface. In a specific embodiment, the ifgroup for file replication (e.g., MFR) is selected based on the remote backup storage system name and local backup storage system MTree path involved in the replication. In an embodiment (e.g., EMC Data Domain systems), an MTree is a top level directory path, i.e., one that is not nested in another directory. This mechanism allows separate ifgroup groups to be created between two backup storage systems for a different MTree path. This is ideal for service provider environments where it is desirable to isolate replication traffic for each tenant to a different network.

Client Routing and IP Management

Client routing is a tool that allows administrators to control client connections using an ifgroup policy. In a specific embodiment, ifgroup facilitates accessing clients on different subnets without using static routes. Subnets can often grow fast when organizations run out of IP addresses. In a specific embodiment, a configuration on server side can be used for automatic distribution of backup LAN IP addresses. In many cases, backup networks are not linked to a DNS server (Domain Name Server), so the backup IP addresses have to be managed separately. Ifgroup provides a way to automate the distribution of IP addresses.

There are multiple customer use cases for client routing with ifgroup. Cost management for charge back purposes is one reason why many enterprise customers have metered-LANs to monitor traffic and control costs. Corporate LANs are metered-LANs, while backup networks are not. Dynamic client routing helps to make sure the backup traffic stays on the backup network, even when the backup client sits on the corporate LAN. In addition, if there is a problem with a client connecting to the backup storage system, ifgroup can prevent the clients from failing back to the public IP. Another use case is for IPv4 to IPv6 transitions. If a client connects with an IPv6 or IPv4 address, it will be routed to the ifgroup of its type.

A third use case is for managing a large pool of clients. In large customer environments it is difficult to maintain a client IP range on the same subnet as the backup storage system. If the client and the backup storage system are on separate subnets, often the solution is to implement static routes. Static routes are manual overrides which have to be tracked offline, which network administrators like to avoid because it creates extra work and risk because all changes are manual and it is easy to overlook one or more static routes over time. A better technique is to create additional IP alias/VLANs to match the client subnet, no longer requiring the use of static routes. A fourth use case is to overcome rules set by network administrators. Often large enterprises do not allow any deviation/changes to the ETC/Host files on Unix clients. With this rule, you cannot make the changes necessary to put these clients onto the backup network. Administrators can overcome this obstacle using the ifgroup architecture.

Figure 4:
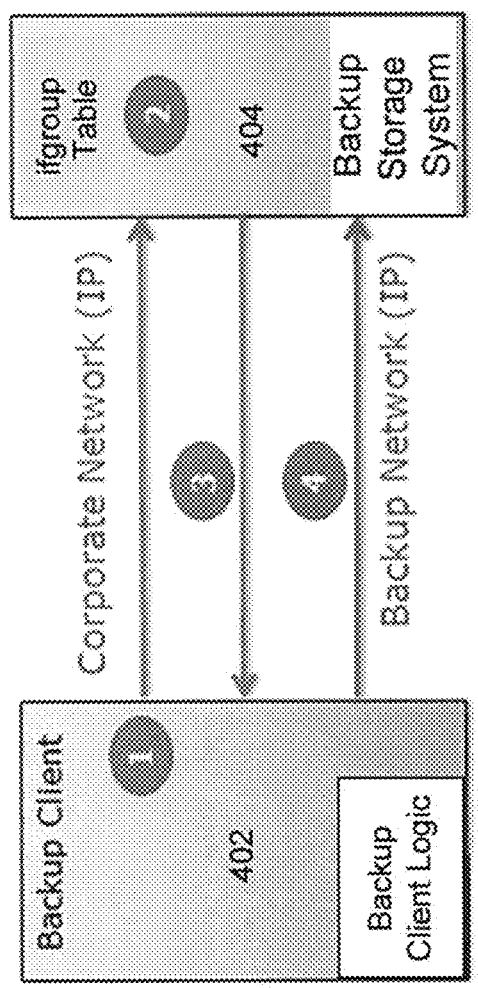
FIG. 4 shows an example of client routing according to a specific embodiment.

FIG. 4 shows a block diagram illustrating how client routing works using ifgroup according to a specific embodiment. In a step 1, the client 402 sends a session request that contains host name, client IP and the backup storage system IP (IPv4 or IPv6). In a step 2, the client information is matched to a group policy (lookup table) stored on the backup storage system 404. In a step 3, the backup storage system issues client a new IP address per group policy. In a step 4, the backup client is connected to the backup storage system over the backup network and begins backup job. In this manner, customers can use ifgroup to avoid having to configure VLAN IPs on clients for the data-path interface they want to use. Without ifgroup customers would need to edit certain files (e.g., the /etc/hosts file) on each client and add an entry for the backup storage system data-path for the particular VLAN.

For the client-side protocol the ifgroup component set can be used for backup-application clients to obtain improved performance. LACP typically does not deliver full bandwidth of all the interfaces that compose the link. For two interfaces, for example, only 40 percent of the second interface is available for user data with LACP.

Some benefits of using ifgroup for networking include delivery of 100 percent or near 100 percent of the interface (no or little overhead), the ability to perform load balancing on the backup storage system and support for VLAN, requiring little to no configuration on the switch or client, fast recovery from network errors with detection at the application level, and NAT translation support. In contrast, LACP does not deliver the full bandwidth of all interfaces, requires additional configuration on the switch to associate interfaces into Ether Channel, changes require taking interfaces offline for configuration, it has higher sensitivity to network errors, and has a disruptive upgrade process. Ifgroup is easier to install and maintain than LACP, can provide greater bandwidth (e.g., up to 60 percent) than LACP, allow changes to be applied more quickly without the need to take interfaces down providing higher availability, provide greater resiliency to network failures, provide load balancing between 1G and 10G interfaces, give customers more flexible client routing options, enable more scalable IP management, and it improves replication performance and reliability.

The ifgroup architecture provides efficient load balancing and client failover, as well as dynamic client routing. With the greater performance and bandwidth that ifgroup provides, customers can reduce costs and maximize private network utilization by redirecting clients. In addition, with ifgroup, hybrid cloud application capabilities allow enabled clients to connect to a backup storage system over the backup network lowering costs and requiring less configuration management.

In a specific embodiment, the ifgroup architecture can be extended to replication to provide higher bandwidth through the use of multiple interfaces and failover to another interface on network errors. It is generally desirable to provide customers with the ability to control the interfaces used for replication data, direct the replication connection over a specific network and utilize multiple network interfaces with high bandwidth and reliability through fail-over. Without ifgroup, the configuration requires the following cumbersome steps:

1) Add an entry in/etc/hosts file on source backup for remote backup and hard code one of the private LAN network interfaces as the destination IP.

2) Add a route on source backup to remote backup specifying a physical/virtual port as exit out of source backup to remote destination IP.

3) Configure LACP through the network on all switches between the backup storage systems for load balancing and failover.

4) This solution requires different applications to use different names for the remote target backup storage system to avoid name conflict in/etc/hosts.

In contrast, the ifgroup architecture uses a simple configuration on the backup storage system through CLIs (command line interfaces), to solve the above problem. In a specific embodiment, the ifgroup architecture applied to replication path performs one or more of the following:

1) Redirects a hostname resolved IP away from the public IP—uses another private backup storage system IP 2) Identifies an ifgroup based on configured selection criteria—single ifgroup where all the interfaces will be reachable to remote backup storage system.

3) Selects a private network interface from a list of interfaces belonging to a group—ensure interface is healthy 4) Provides load balancing across the interfaces of the ifgroup 5) Provides a failover interface for recovery from the interfaces of the ifgroup.

Figure 5:
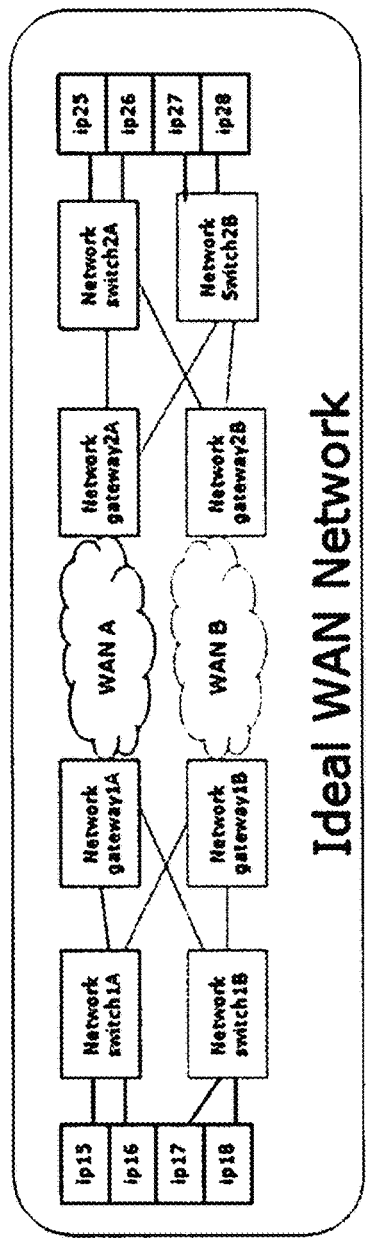
FIG. 5 shows an example of a WAN network according to a specific embodiment.
Figure 6:
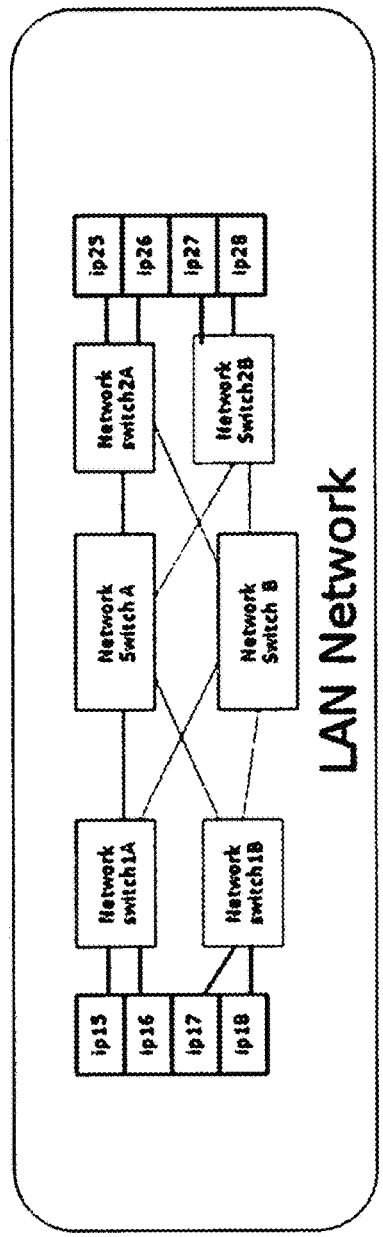
FIG. 6 shows an example of a LAN network according to a specific embodiment.

In a specific embodiment, the ifgroup architecture is source IP to destination IP, where intermediate components between the source and destination can be multiple switches or gateways. FIG. 5 shows an example of a WAN network including two WANs, WAN A and WAN B. FIG. 6 shows an example of a LAN network including two network switches, Switch A and Switch B. The examples of FIGS. 5 and 6 show four source IP addresses and four destination IP addresses that can be reached by one another. For example, IP15 can reach IP25, IP26, IP27 or IP28. The shown configuration for the switches and gateways allow for redundancy such that there is no single point of failure. Each switch and gateway are configured to create redundant paths for failover recovery.

Figure 7:
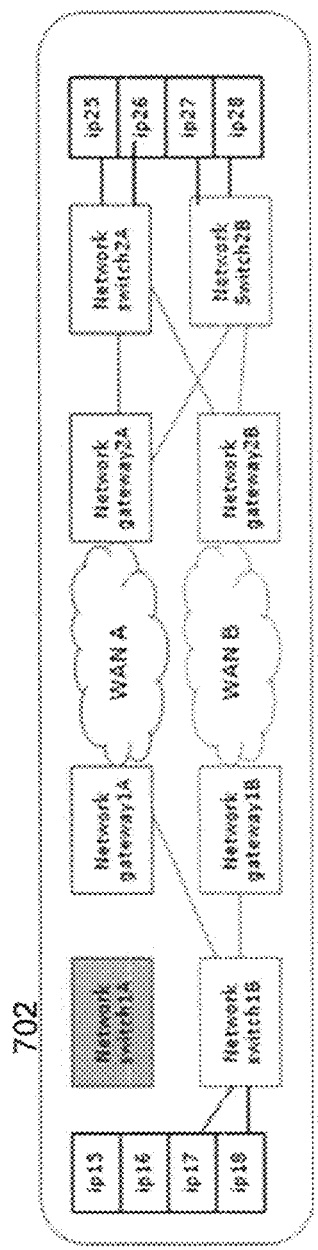
FIG. 7 shows an example of a failed network element according to a specific embodiment.
Figure 8:
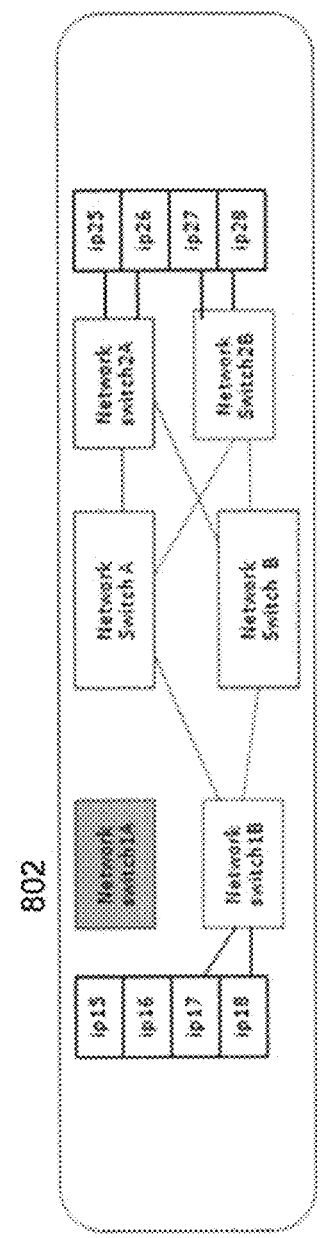
FIG. 8 shows another example of a failed network element according to a specific embodiment.

FIGS. 7 and 8 illustrate failure situations for the networks of FIGS. 5 and 6 respectively. In the examples of FIGS. 7 and 8, the failed network element is filled in and the lines connecting it to the network are removed to emphasize that it is not available. Thus, network switch 702 in FIG. 7 is not available, and network switch 802 in FIG. 8 is not available. If Network Switch 1A fails, IP15 and IP16 will not be used, and traffic will be moved to the alternate IP addresses of that ifgroup being IP17 and IP18, but the destination can still use all four IP addresses.

Figure 9:
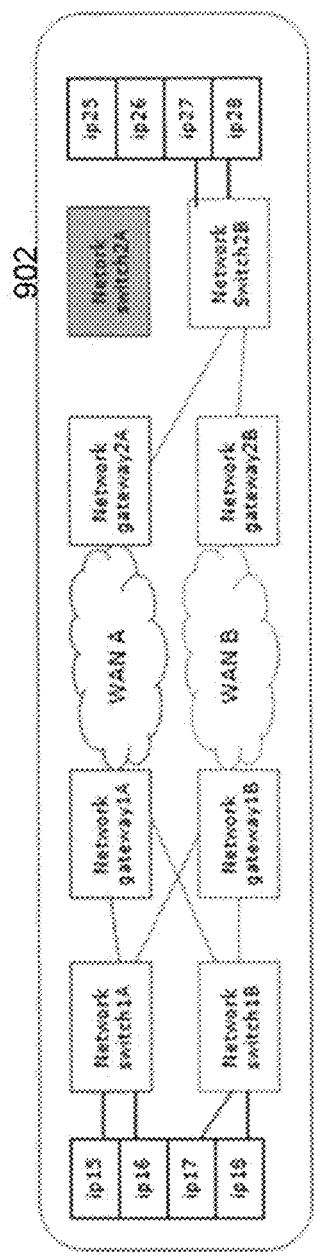
FIG. 9 shows an example of a failed network element on a destination side according to a specific embodiment.
Figure 10:
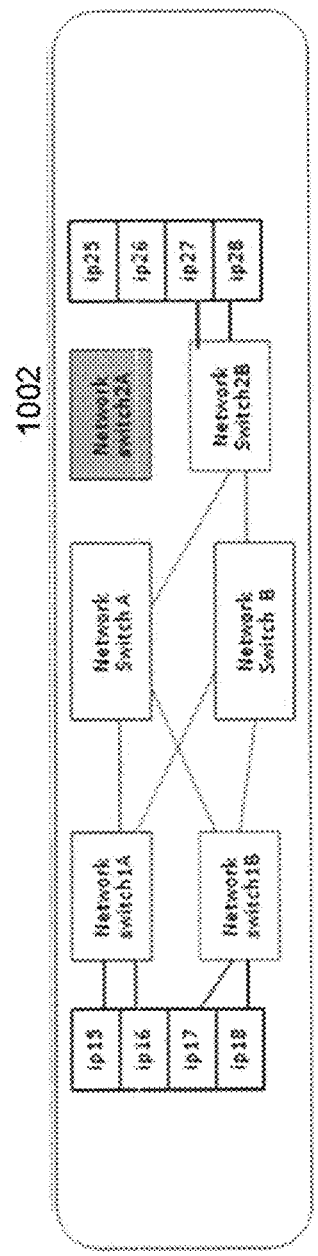
FIG. 10 shows another example of a failed network element on a destination side according to a specific embodiment.

FIGS. 9 and 10 illustrates failure situations on the destination side for the networks of FIGS. 5 and 6 respectively. As shown in the examples of FIGS. 9 and 10, the same situation described above will apply to the destination side. Thus, network switch 902 in FIG. 9 is not available and network switch 1002 in FIG. 10 is not available. If Network Switch 2A fails, data will move to IP27 and IP28 and it will come from all four source IP addresses.

Figure 11:
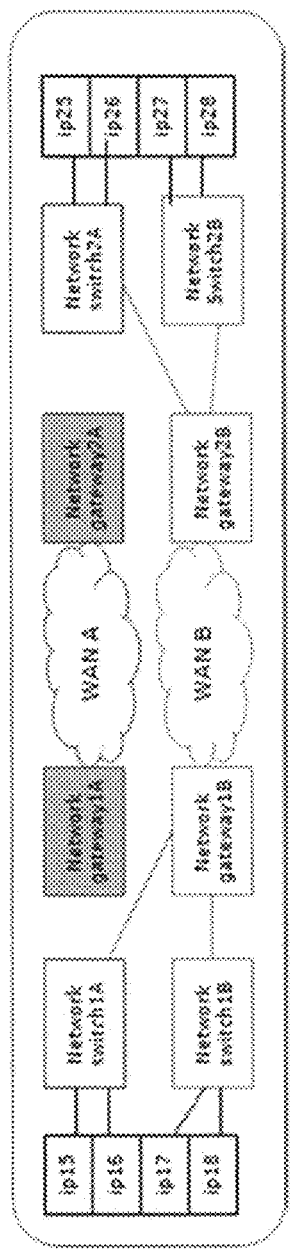
FIG. 11 shows another example of a failed network element according to a specific embodiment.
Figure 12:
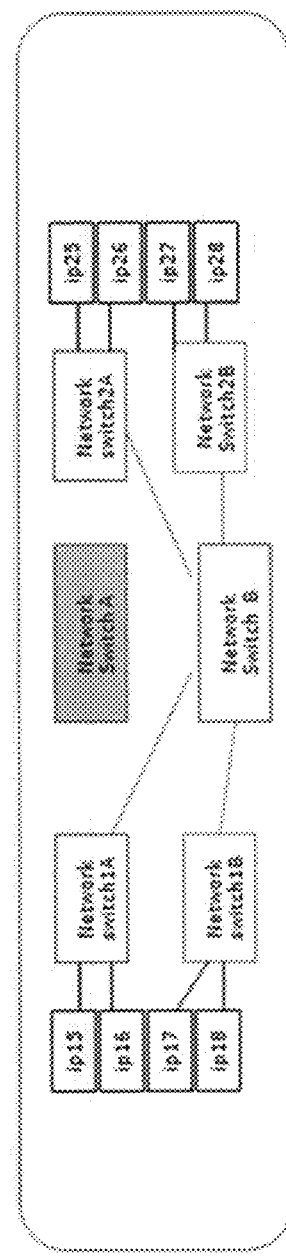
FIG. 12 shows yet another example of a failed network element according to a specific embodiment.

FIGS. 11 and 12 illustrates other failure situations for the networks of FIGS. 5 and 6 respectively. As shown in the examples of FIGS. 11 and 12, if WAN A or Network switch A is down, all four IP addresses on both source and destination will continue to be used, while WAN B/Network Switch B takes all the traffic.

Customer Use Cases

It is generally desirable for backup applications to send their replication data over their own network and utilize multiple network interfaces with high bandwidth and reliability through fail-over. In an embodiment of the ifgroup methodology, all replications paths can be supported.

Figure 13:
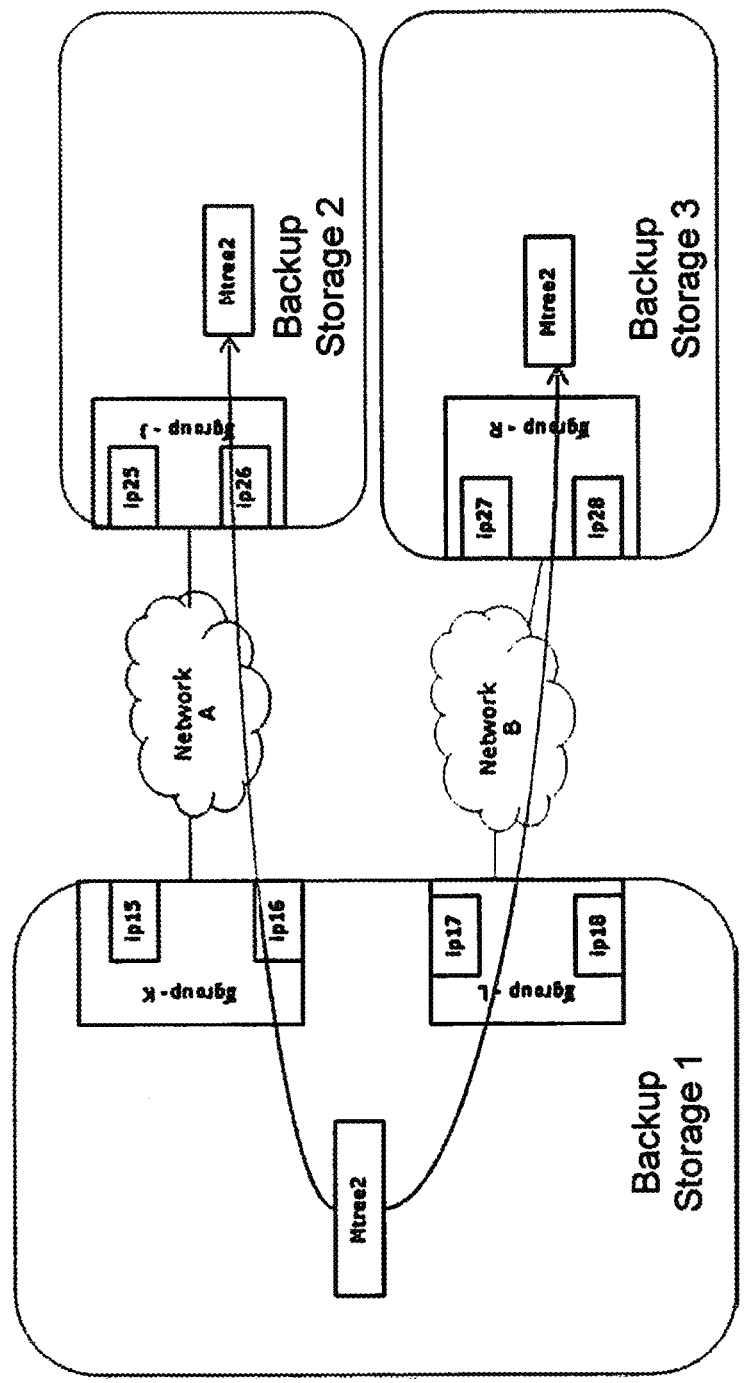
FIG. 13 shows a block diagram of a fan-out according to a specific embodiment.

With regard to fan-out, FIG. 13 shows an example of a fan-out situation, under some embodiments. In the example shown in FIG. 13, MTree2 is replicated from backup storage 1 to backup storage 2 over network A and also from backup storage 1 to backup storage 3 over network B.

Table A below shows a further example of the fan-out.

TABLE A

|  | Backup Storage 1 | Backup Storage 2 | Backup Storage 3 |
|---|---|---|---|
| group and IPs | ifgroup create K<br>ifgroup add K interface ip15<br>ifgroup add K interface ip16<br>ifgroup enable K<br>Ifgroup create L<br>ifgroup add L interface ip17<br>ifgroup add L interface ip18<br>ifgroup enable L | Ifgroup create J<br>ifgroup add J interface ip25<br>ifgroup add J interface ip26<br>ifgroup enable J | Ifgroup create R<br>ifgroup add R interface ip27<br>ifgroup add R interface ip28<br>ifgroup enable R |

TABLE A-continued

|  | Backup Storage 1 | Backup Storage 2 | Backup Storage 3 |
|---|---|---|---|
| Replicate | ifgroup add repl K mtree /data/col1/Mtree2 remote backup_storage2.example.com<br>ifgroup add repl L mtree /data/col1/Mtree2 remote backup_storage3.example.com | ifgroup add repl J mtree /data/col1/Mtree2 | ifgroup add repl R mtree /data/col1/Mtree2 |

Figure 14:
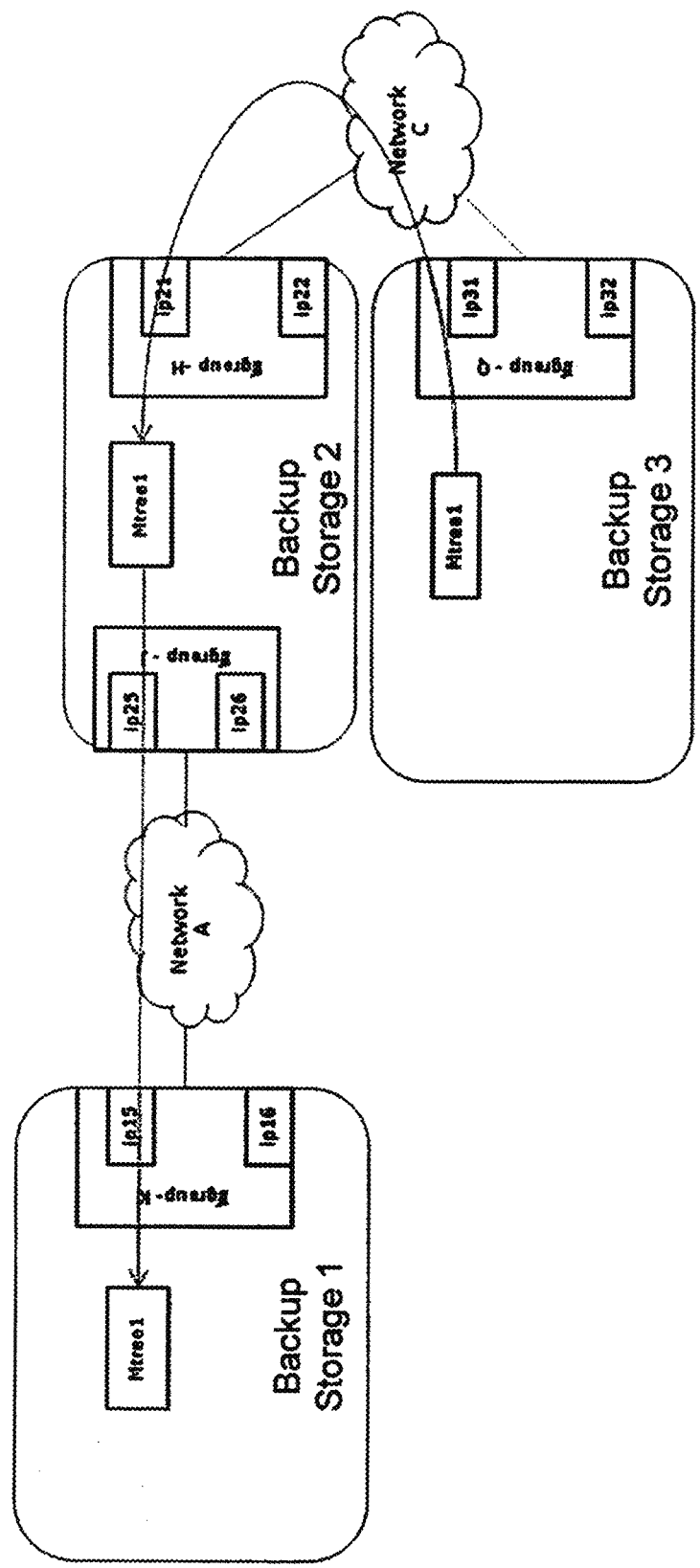
FIG. 14 shows a block diagram of a cascade according to a specific embodiment.

With respect to cascading, FIG. 14 shows an example for cascading, under some embodiments. As shown in FIG. 14, Mtree1 is replicated from backup storage 3 to backup storage 2 through network C, and to backup storage 1 through network A. Table B below shows a further example of the cascading.

TABLE B

|  | Backup Storage 1 | Backup Storage 2 | Backup Storage 3 |
|---|---|---|---|
| group and IPs | ifgroup create K<br>ifgroup add K interface ip15<br>ifgroup add K interface ip16<br>ifgroup enable K | Ifgroup create J<br>ifgroup add J interface ip25<br>ifgroup add J interface ip26<br>ifgroup enable J<br>fgroup create H<br>ifgroup add H interface ip21<br>ifgroup add H interface ip22<br>ifgroup enable H | Ifgroup create Q<br>ifgroup add Q interface ip31<br>ifgroup add Q interface ip32<br>ifgroup enable Q |
| replicate | ifgroup add repl K mtree /data/col1/Mtree1 | ifgroup add repl J mtree /data/col1/Mtree1 remote backup_storage1.example.com<br>ifgroup add repl H mtree /data/col1/Mtree1 remote backup_storage3.example.com | ifgroup add repl Q mtree /data/col1/Mtree1 |

Figure 15:
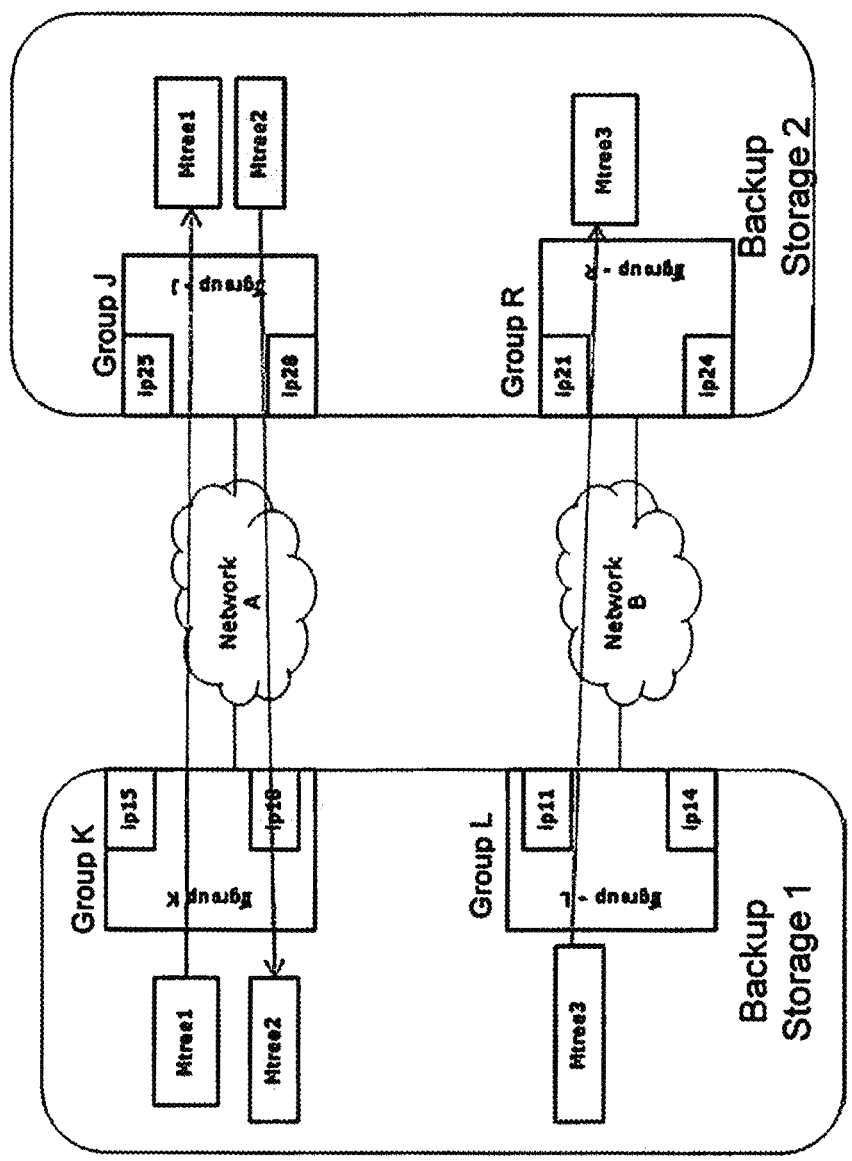
FIG. 15 shows a block diagram of a fan-in according to a specific embodiment.

With respect to fan-in, FIG. 15 shows an example of a fan-in for a bi-directional, multiple customer network. In a specific embodiment, a fan-in is a point-to-point connection between backup storage systems, each backup storage has a source MTree replicating to a target backup storage MTree, through a network. FIG. 15 also shows a bidirectional replication where backup storage 1 is a source for MTree1 but a target for MTree2.

Another scenario includes a service provider where each customer would like their replication to traverse their own network. Customer Network A is using that network for replication for MTree1 backup storage 1 to backup storage 2, as well as MTree2 backup storage 2 to backup storage 1. Customer Network B is using that network for replication form MTree3 backup storage 1 to backup storage 2.

Table C below shows a further example of the fan-in.

TABLE C

|  | Backup Storage 1 | Backup Storage 2 |
|---|---|---|
| group and IPs | ifgroup create K<br>ifgroup add K interface ip15<br>ifgroup add K interface ip16<br>ifgroup enable K<br>ifgroup create L<br>ifgroup add L interface ip11<br>ifgroup add L interface ip14<br>ifgroup enable L | Ifgroup create J<br>ifgroup add J interface ip25<br>ifgroup add J interface ip28<br>ifgroup enable J<br>fgroup create R<br>ifgroup add R interface ip21<br>ifgroup add R interface ip24<br>ifgroup enable R |

TABLE C-continued

| | Backup Storage 1 | Backup Storage 2 |
|---|---|---|
| replicate | ifgroup add K replicate mtee /data/col1/Mtree1<br>ifgroup add K replicate mtee /data/col1/Mtree2<br>ifgroup add L replicate mtee /data/col1/Mtree3 | ifgroup add J replicate mtree /data/col1/Mtree1<br>ifgroup add J replicate mtree /data/col1/Mtree2<br>ifgroup add R replicate mtree /data/col1/Mtree3 |

In a specific embodiment, support is provided to configure ifgroup for replication such that all the use cases are covered, fan-out, cascade and multiple-customer network. Support is provided to file replication (e.g., MFR) to utilize ifgroup replication to select both source and destination interfaces on LAN. This can cover VLAN support for file-replication without the need to use different remote backup storage host names. Support is provided to file replication (e.g., MFR) to utilize ifgroup replication to select the destination interface for WAN, while allowing source side to use default gateway. In a specific embodiment, replication throttling is not impacted.

In another specific embodiment, a GUI is provided to configure the ifgroup for replication. File replication may be provided for VDISK implementations. MTree replication may be configured for any protocol. Collection replication may be performed to move all data from one backup storage system to another. In a specific embodiment, supported topologies include single node backup storage system, archiver (ART), no special handling for GDA since GDA may not be supported, and no impact of high availability systems.

In a specific embodiment, ifgroup for file-replication supports LAN/WAN over multiple interfaces with load balancing. This functionality may utilize ifgroup CLIs (command line interfaces or command language interpreters) and infrastructure, adding local Mtree and/or destination backup storage to appropriate ifgroup groups that need to support file-replication. On failure, an alternate interface may be used on same group if one is available, otherwise, if the current interface is still alive, it will be retried. load balancing and failover may be performed to restart the file replication.

Certain user interface modifications may be made to implement the ifgroup capability. FIG. 16 shows an example code segment for certain ifgroup configuration modifications according to a specific example embodiment. FIG. 17 illustrates certain example connections for ifgroup under an example implementation.

Programming Interfaces

In a specific embodiment, both on source and target backup storage (e.g., DDR), the IP to use for replication is selected from the ifgroup group that matches the selection criteria. For backup clients, it is the client hostname that selects the ifgroup. For replication, it is "Mtree: remote-host" that makes the selection. One, both or none can be configured leaving the other as wild-card (*:*, *:remote-host, Mtree1:* or Mtree1:remote-host). This allows for a single ifgroup for all replication or multiple ifgroup groups for replication based on the configuration. In an embodiment, a new remote procedure call (RPC) may be added to a request the IP from remote backup storage. The request provides its local host name as remote host name, and the file handle for target file. On remote backup storage, file handle is used to derive the MTree. Using the MTree and sent remote host name, the ifgroup is identified. An IP address is requested from that ifgroup, same API used by backup clients. Since resume support may not be needed, on error, a new request may be made to remote backup storage for a new ifgroup IP. The ifgroup algorithm is called and given the IP address most recently tried so that the provided IP is another IP, not the same one.

Below is an example of code for filecopy arguments available at start (nfs3.x) from the client.

```
struct filecopy3args {
    nfs_fh3 dst_fh;
    hostname3 dst_host;
};
struct filecopystart3args {
    nfs_fh3 src_fh;
    filecopy3args dst;
};
```

Below is an example of code for an ifgroup backup storage exchange. In this example, the source backup storage (e.g., DDR) sends the following to the target backup storage (e.g., DDR).

```
struct mfr_qry_rsc_args_t {
    ddr_fh dst_fh;
    dd_bool_t validate_association;
    char    src_stu[REPL_MAX_LSU_NAME_LEN];
    string  src_host<REPL_RPC_LIMIT_HOSTNAME_LEN>;
    char    last_vrapid_ip[REPL_MAX_IP_STR_LEN];
};
```

In the example below, the target backup storage sends the reply.

```
struct_mfr_qry_rsc_res_t {
    dd_errno_t eno;
    dd_int32_t avail_repl_stream;
    dd_bool_t validate_association;
    char    vrapid_ip[REPL_MAX_IP_STR_LEN];
    char    dst_stu[REPL_MAX_LSU_NAME_LEN];
};
```

Extra information exchanged for debug purposes and other processes. Ifgroup counters may be used to track replication usage of interface in the same or similar way it tracks read and write.

Below are some examples of operational scenarios.

1) Initially, alternate-IP is NULL, so all IPs can be chosen.
2) Prior to start of filecopy, New Replication RPC sent to get destination IP
3) If destination IP is on same sub-net, (LAN solution)
3a) Get ifgroup from source side.
3b) Bind the IP to the socket
4) If destination IP is not on same sub-net (WAN solution)
4a) Default gateway route setting will be used
5) Open client connection
6) If connection fails,
6a) 1st try: set both alternate IPs for source and destination with last used value—go to step 2.
6b) 2nd try: set the alternate IP for destination only with last used value—go to step 2.
6c) 3rd try: if source was used, set the alternate IP for source value—go to step 2.
If an error occurs later in replication, retry filecopy starting with step 1 for as many times as configured for file replication retry.

Regarding network protocol, a new RPC may be added to repl.x for ifgroup IP selection exchange and stream checks between source backup storage and target backup storage. Regarding on-disk structures, there may be a new protocol registry under "protocol." for ifgroup registry to select mtree: remote-host ifgroup for replication. In an embodiment, there is no impact on the customer backup data. Further, there will be no impact performance of read and write operations. In a specific embodiment, additional security checks are performed one time per connection and per file, not on every read or write request. In a specific embodiment, all new persistent data will be in protocol registry which may be automatically included in Autosupport. CLI to display "ifgroup show config all" will be added to autosupport.

In a specific embodiment, for backup client to backup storage communication, network error recovery are handled at the application level, per RPC request. For file replication, (e.g., MFR), the recovery is to resend, and all metadata is resent. Once ifgroup load balancing is added to file-replication, the same may be added RPC recovery. There may be a bounce-connection capability with resume on the last successful RPC for file replication. In another specific embodiment, ifgroup replication includes VDISK MFR, MTree replication, and Collection replication. An ifgroup may be available for NFS for load balancing and failover. In a specific embodiment, ifgroup refers to an interface group for load balancing and failover interface selection. FQDN refers to a fully qualified domain name. MFR refers to Managed File Replication, that is, replicate one file at a time to target backup storage.

In a specific embodiment, the ifgroup mechanism is used by backup clients to improve the network performance and reliability. An ifgroup can allow customers to utilize multiple interfaces on the backup storage system without having to configure each client with a different interface, without modifying the /etc/hosts file (for example) on the client to point to a different interface. Instead of configuring a backup storage interface to a specific client, ifgroup allows all the clients to use all the interfaces and performs load balancing per job (read or write stream). To support VLANs, ifgroup groups may be provided, where a collection of clients on a VLAN belong to a specific ifgroup group. The client hostname may be used as the selection criteria for which ifgroup group of interfaces to use. Customers can configure the complete client name or use the domain-name for the ifgroup group selection. There can be an auto detect for VLAN where clients that connect to an ifgroup interface are considered to belong to that group and do not require the hostname configuration to select the ifgroup group.

The ifgroup architecture manages the interfaces per group by keeping counters for the active jobs. The ifgroup allows an IP address to exist in one and only one group. If the same physical interface is needed in another group, it can be implemented as an alias IP, different IP. In a specific embodiment, IP assignments are always assigned in the same order, using the following algorithm within the group.

1) Start with 1st IP as Current IP, 2nd IP as next IP
2) Compare Current IP active job count to next IP active job count.
3) If next count not greater, next IP is Current, else Current is kept.
4) Go to step 2 until no more next IP.
5) Make sure the chosen IP is healthy if it has no active jobs
6) If chosen IP is not healthy, refresh the list, and start again with step 1.

The algorithm will start out using the last IP, for example eth4b before eth1a. But the load balancing will ensure that the jobs will get distributed on all the interfaces. In a specific embodiment, the algorithm does not consider the interface speed, jobs on faster interfaces will complete faster and will get the next job assigned to that interface.

In a specific embodiment, the ifgroup algorithm is passed the group and an optional alternate IP where the alternate is the IP not to choose in order to provide an alternate to that IP. For the backup client logic (e.g., DD Boost), the call for alternate is used to return to the client another IP from the same ifgroup group. For backup clients it can be important to have the alternate IP available so that it can resume a job without restart. Backup client exchange for ifgroup IP is done in an RPC where the client hostname is provided and the reply from the backup storage returns the IP address.

FIG. 18 shows an example where customers can view the interface usage with CLI. The display would show that write and read jobs are on the ifgroup interface while the client control connection will remain on the administered IP, the IP the client first connected to on the backup storage system (e.g., DDR). The Repl-out and Repl-in paths show the actual connection used between backup storage systems for the file replication. FIG. 19 shows an example of connections for IPv6 networks, under an embodiment.

Figures 20, 21:
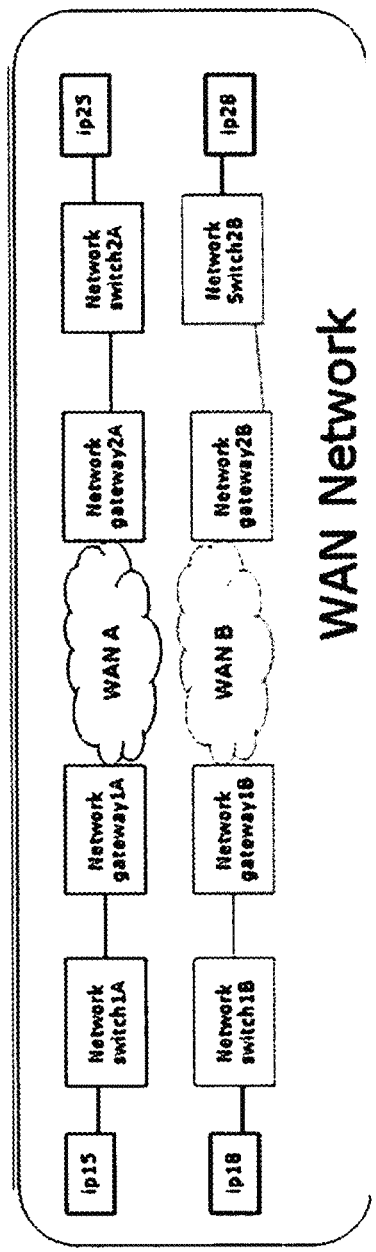
FIG. 20 shows an example of a WAN network implementing certain functions according to a specific embodiment.
FIG. 21 shows a table of behavior for the example shown in FIG. 20 according to a specific embodiment.

In a specific embodiment, WAN recovery is limited to a single IP per default gateway. Therefore, in this specific embodiment, there are only two IPs that can be used for two gateways. FIG. 20 illustrates the use of two IP addresses for this embodiment. As shown in FIG. 20, when the destination is IP25, traffic will always go out to network A from IP15 on the backup storage, but can return on IP18. When the destination is IP28, traffic will flow through network B IP18 but again it can return on IP15. FIG. 21 is a table that shows an example of this behavior. In a specific embodiment, having two different IP interfaces on the same backup storage involved in the connection may not be suitable for ifgroup, as the system may not properly detect a failed interface. For example, if IP15 fails and IP18 was the source, the error may be seen on IP18 when in it is actually IP15 failing as source out. For this reason, in some cases when the destination is on the WAN (not on same sub-net as source IP, source will default to ADDR_ANY. That will ensure that IP15 is used for network A and IP18 is used for network B. In another specific embodiment, the source will perform the same IP bind done when the sub-nets match.

Figure 22:
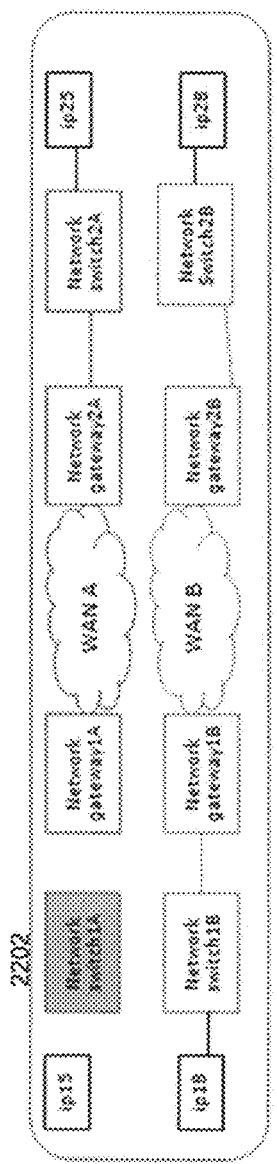
FIG. 22 shows an example of a failed network element according to a specific embodiment.
Figure 23:
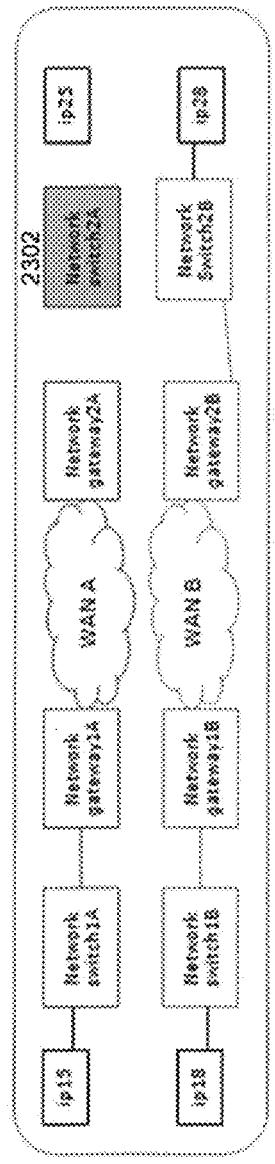
FIG. 23 shows another example of a failed network element according to a specific embodiment.
Figure 24:
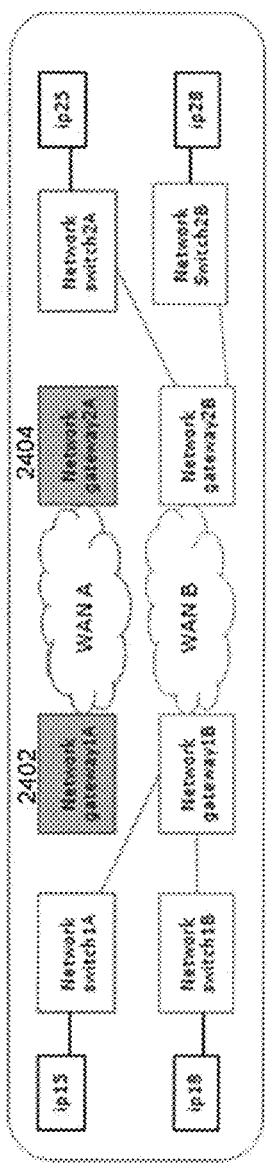
FIG. 24 shows yet another example of a failed network element according to a specific embodiment.

FIGS. 22, 23 and 24 each show examples of failed network elements in which connections from these elements to the network are removed to emphasize that it is not available. In FIG. 22, switch 2202 is failed, in FIG. 23, network switch 2302 is failed, and in FIG. 24, gateways 2402 and 2404 are failed. In a specific embodiment, if any part of Network A fails, IP15 on source and IP25 on destination will not be used. All traffic will be moved to the alternate IP addresses of that ifgroup being IP18 and destination IP28. The behavior for all three use cases below will be the same when any part of Network A is down.

Ifgroup Definition

Figure 29:
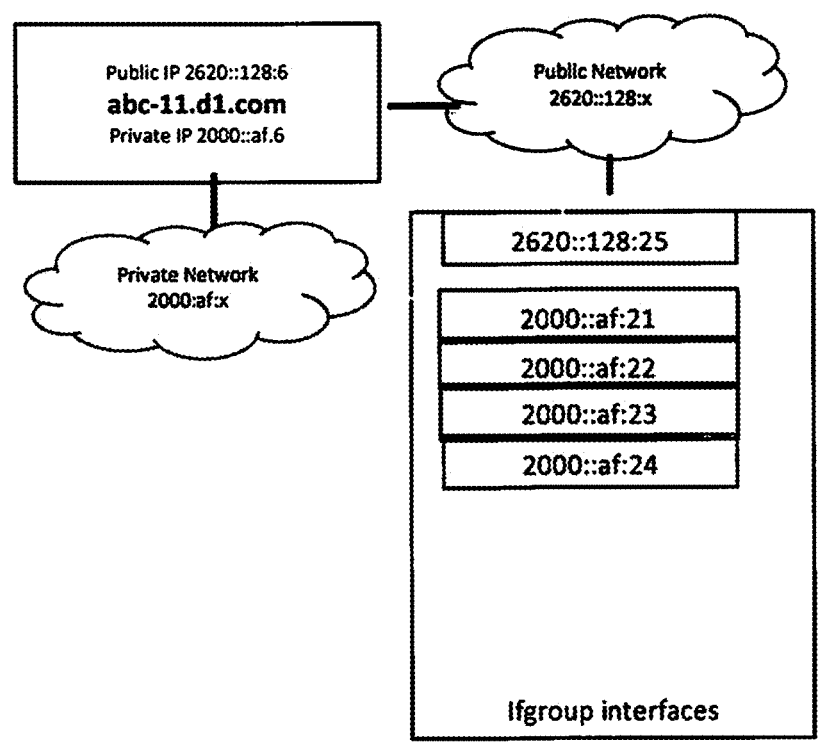
FIG. 29 is a block diagram that illustrates the use of ifgroup interfaces to control client connections on a private network, under some embodiments.

FIG. 29 is a block diagram that illustrates the use of ifgroup interfaces to control client connections on a private network, under some embodiments. As shown in FIG. 29, the private network corresponds to one ifgroup groups. This allows a client to connect to a host (e.g., DDR) using a public IP address, but connect on the private IP address for read/write operations. Thus, as shown in FIG. 29, the client first connect on the public network (2620::128:x), then on the private network (2000:af:x), as shown in the order of the ifgroup interfaces. An alternative private IP address is saved and used if there is a network error. For the example shown, the alternative IP is 2000::af:23, and a second alternative is 2000::af:24, which is available if the first alternative fails. If the final alternative IP address fails, the client connects back on the public network 2620::128:x. Thus, the ifgroup provides a mechanism whereby a client can connect to a host first over a public network then over a private network or series of alternate private networks for read/write operations. The ifgroup mechanism identifies the private network for each client and facilitates load balancing against multiple DDR interfaces within same private network, and fail-over within private network.

Ifgroup Replication

In an embodiment ifgroup is used for managed file replication. Many different IP types can be supported, such as IPv4 or IPv6, Alias IP/VLAN IP, and LACP and fail-over aggregation is supported. A local MTree plus destination node is used to select the ifgroup group. Load balancing is provided against multiple interfaces within the same private network, i.e., within the ifgroup group. Failover is provided within the private network, and support for host failover is configured on the source. As described further below, ifgroup replication supports Network Address Translation (NAT).

In ifgroup replication, the source determines the connection. The replication process has the four main steps of: (1) lookup ifgroup IP on source, (2) request ifgroup IP from destination, (3) On source attempt connection using various IPs, and (4) retry from (1) if there is a network error. With respect to the ifgroup IP lookup (1), the ifgroup IP on the source is selected based on the local Mtree for replication, the remote host-name (destination), or a returned value for the first IP and alternate second IP address. With respect to the ifgroup IP request from the destination (2), the ifgroup is selected based on the local Mtree for replication, the remote host-name (source), or a returned value for the first IP and alternate second IP address. For the connection attempt, the source tries, in order of success: the first source IP with the first destination IP, the second source IP with the first destination IP, the first source IP with the second destination IP, and the second source IP with the second destination IP. If there is no connection, the process retries from step (1).

With regard to ifgroup replication configuration, the process supports multiple replication configurations using the local Mtree and remote host. Multiple networks between the same hosts use the Mtree to differentiate. For one host to multiple hosts, the host is used to differentiate, and for cascaded hosts, both the host and the Mtree are used to differentiate.

Ifgroup replication can be done for WAN selection or for LAN selection. For WAN selection, there are a maximum of two IP addresses in the replication group for two gateways between a first and second ifgroup. There is one ifgroup for backup and one ifgroup for the replication path. The selection process proceeds as described directly above. For WANs, each ifgroup IP address on the source replication group is reachable to one destination group IP. For LAN selection, there is one ifgroup for backup and one ifgroup for the replication path. The selection process proceeds as described directly above. For LANs, all ifgroup IP addresses on the source replication group are reachable to one destination group IP.

NAT Functionality

The ifgroup model has been extended to allow a service provider to deal with a conflicting address space from multiple tenants with load-balance and failover. In many backup environments, customers use NAT to connect to existing networks that have duplicate IP addresses, and load balancing and failover with NAT is not possible with LACP. Embodiments allow the server to configure pre-NAT IP addresses and put them in an ifgroup group. Based on client hostname (FQDN), the process returns an ifgroup IP to client that it can use it for backup/restore operations. When a client starts backup/restore, the process increments the pre-NAT addresses to maintain load-balance, that is, the least used address in ifgroup is always selected for the client.

Figure 25:
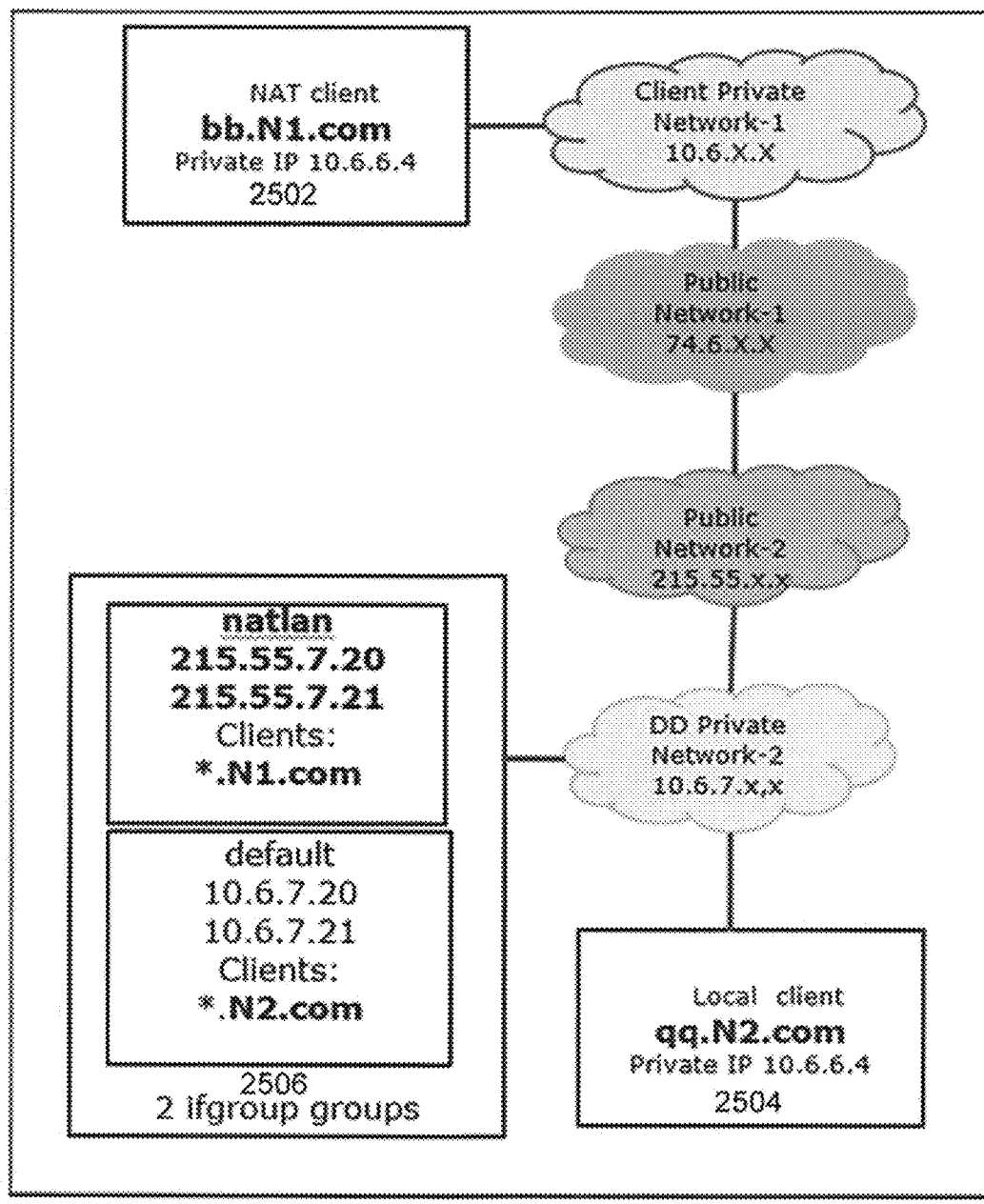
FIG. 25 shows an example of ifgroup capability with NAT according to a specific embodiment.

FIG. 25 is a block diagram illustrating full ifgroup capability with NAT, under some embodiments. FIG. 25 illustrates a network environment in which a NAT client 2502 is coupled through a client private network-1 to a local client 2504 through two public networks and a second private network (network-2), as an example. In a specific embodiment, there is a separate NAT group. The backup system includes a process that creates ifgroup, as described above. For the example of FIG. 25 the process creates a new ifgroup 2506, which is labeled, e.g., "natlan." For each interface in the default group, the process 106 (in FIG. 1) adds an alias IP set to the public network. In an embodiment, it adds the alias IP to group "natlan," and sets the client domain for "natlan." Internal clients may remain in the default group. NAT clients will load balance and failover within "natlan" group. NAT may require routers and static IP configuration for connectivity.

Figure 27:
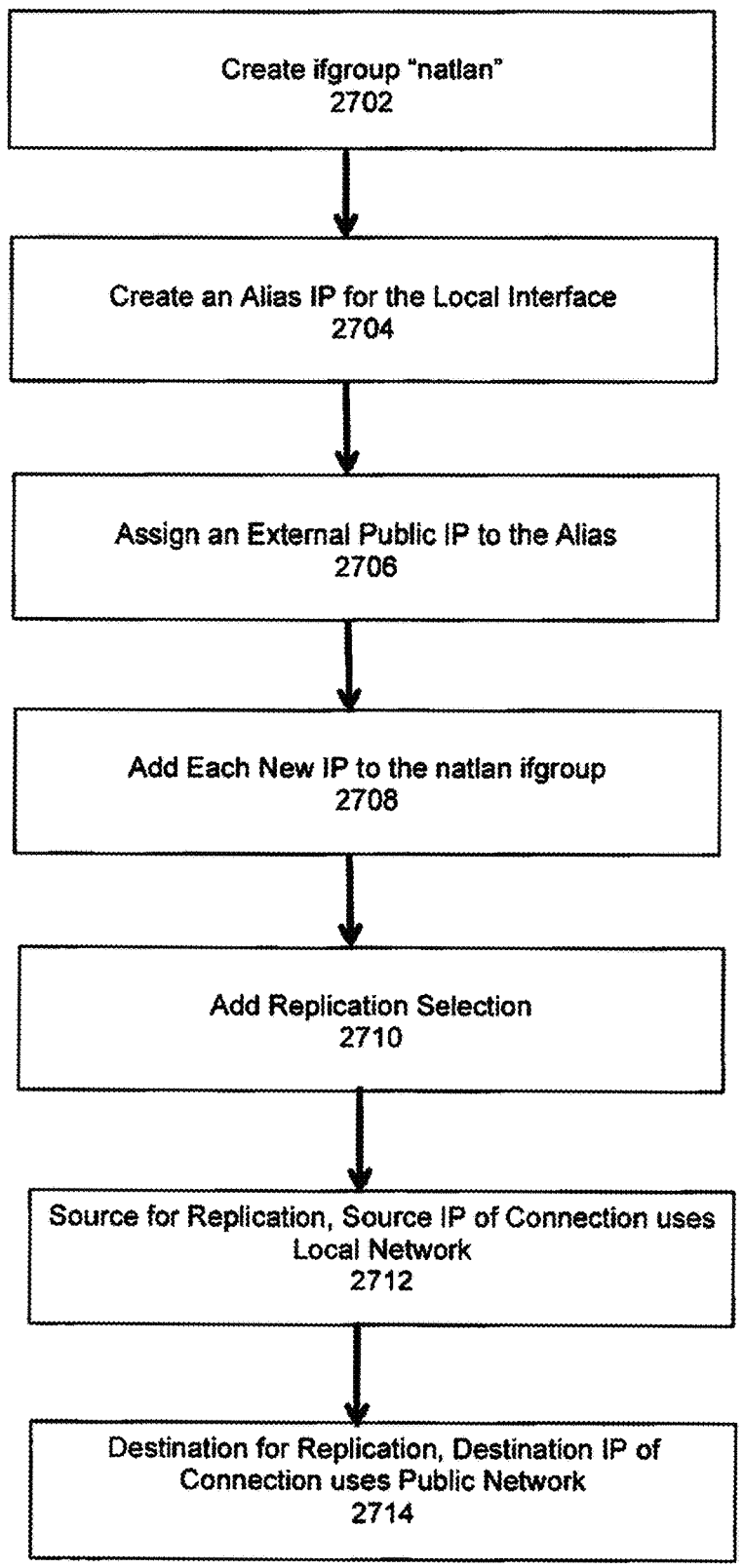
FIG. 27 is a flow diagram that illustrates a method of providing ifgroup replication support over NAT, under some embodiments.

For ifgroup replication support over NAT, each network node (e.g., DD device) is in a local private network. The ifgroup replication is performed for a public IP address, and not the local IP address for a destination ifgroup. FIG. 27 is a flow diagram that illustrates a method of providing ifgroup replication support over NAT, under some embodiments. The process creates an ifgroup group named "natlan," or any other similar distinguishing name, block 2702. It then creates an alias IP for the local interface, block 2704, and assigns the external public IP to the alias, block 2706. Each of these new IPs is added to the ifgroup group "natlan," block 2708. The process then adds the replication selection (local Mtree path and/or remote DD Hostname), block 2710. As shown in block 2712, the source DD for replication, source IP of connection needs to use the local network; and as shown in block 2714, the destination DD for replication, destination IP of connection needs to use the public network.

Figure 26:
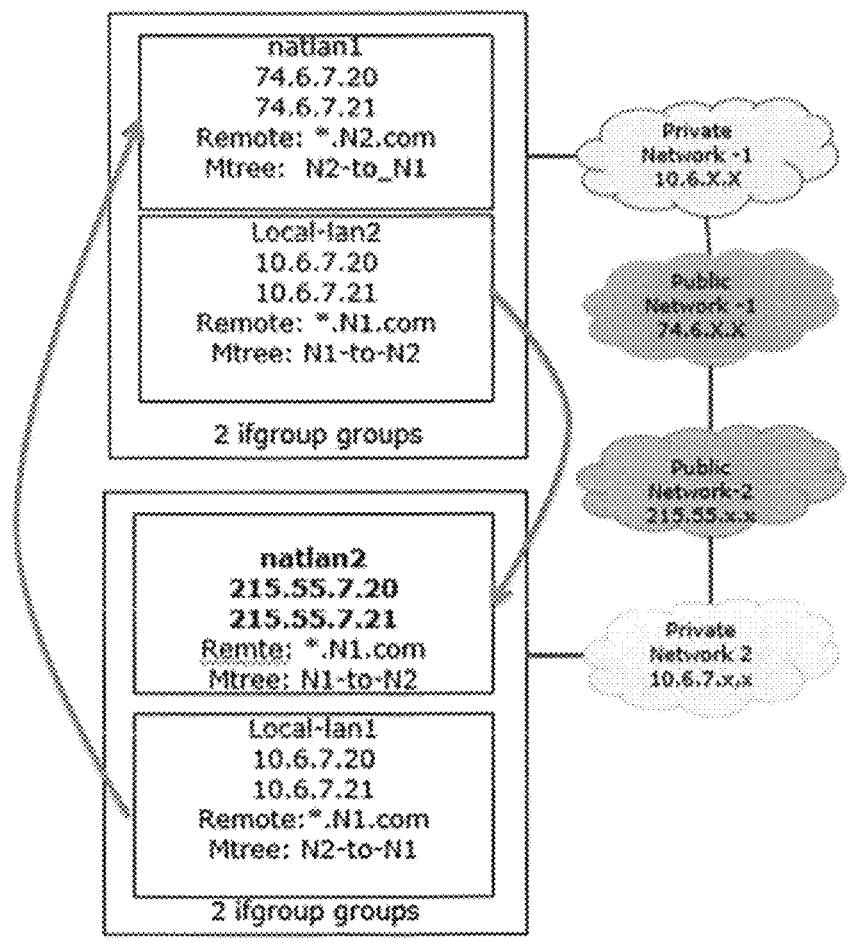
FIG. 26 shows another example of ifgroup capability with NAT according to a specific embodiment.

FIG. 26 is a block diagram that shows an example implementation of ifgroup replication support over NAT, under some embodiments. As shown in FIG. 26, NAT is provided in both directions, i.e., from local-lan2 to natlan2, and from local-lan1 to natlan1, for two ifgroup groups coupled to each other over respective private networks through two public networks.

Figure 28:
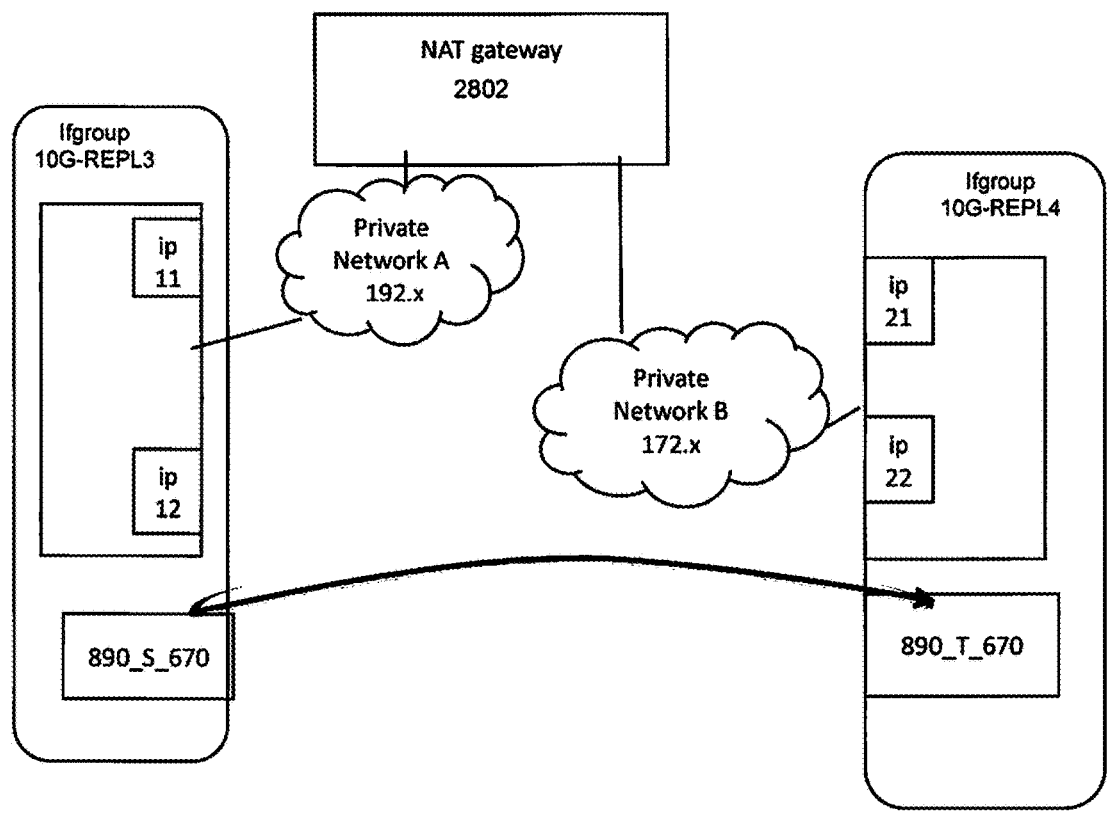
FIG. 28 is a block diagram illustrating ifgroup replication for NAT in a WAN environment for two networks in the same ifgroup group, under an embodiment.

FIG. 28 is a block diagram illustrating ifgroup replication for NAT in a WAN environment for two networks in the same ifgroup group, under an embodiment. As shown in FIG. 28, NAT gateway 2802 couples a first ifgroup (10G-REPL3) to a second ifgroup (10G-REPL4) through two private networks, A and B.

In general, the ifgroup mechanism helps to address the aforementioned problem with LACPs, which is that LACP is difficult to configure across multiple routers. With an ifgroup, no configuration on any network device may be needed. Multiple tenants can easily configure their preferred network to keep their data on their own network. The ifgroup mechanism facilitates address translation (NAT) load balancing over multiple Internet Protocol (IP) addresses (e.g., two or more IP addresses). In this specific embodiment, client connections are load balanced over multiple server interfaces that are across NAT. This is provided in conjunction with the ifgroup, which performs IP redirect, load balance and fail-over by providing this same functionality across NAT through the simple alias network configuration on the server and a proprietary field added to a storage system message from client to server. The client can be a backup client or source storage system client performing file-replication to target storage system.

WAN Dynamic Load Balancing and Failover

Embodiments of the ifgroup concept have been extended to allow for providing load-balance and failover over NAT in cases where the replication network is outside the local backup network. In an embodiment, the destination server configures pre-NAT IP addresses and puts them in an ifgroup group. Based on the destination directory path and remote source host, the process selects the ifgroup group. When the source server starts replication, it increments the pre-NAT addresses to maintain load-balance, that is, the least used address in ifgroup is always selected for the replication.

In a specific embodiment, systems and methods are provided for a WAN dynamic load balancing and fail-over. Given multiple networks each with multiple interfaces, systems and methods are provided for dynamically selecting the network and providing load balance and fail-over recovery on that network. One example of a use case includes a service provider on source and destination storage system, where there are multiple tenants using storage on source and replicating to destination. Each tenant wants to have the replication go through their own network. The tenant also wants to have multiple paths through their network for higher performance and redundancy for recovery. The ifgroup is enhanced to consider the directory (Mtree) being used for replication to select the correct tenant network. Each storage system selects the local IP to use for replication, source side and destination side. If multiple IP addresses are available then load balancing is performed against the available IP addresses.

Customers often desire the ability to control the interfaces used for replication data, direct the replication connection over a specific network and utilize multiple network interfaces with high bandwidth and reliability through fail-over. Without an ifgroup, the configuration requires the following cumbersome steps: add an entry in/etc/hosts file on source storage system for remote storage system and hard code one of the private LAN network interfaces as the destination IP, add a route on source storage to remote storage specifying a physical/virtual port as exit out of source storage to remote destination IP. Configure LACP through the network on all switches between the storage systems for load balancing and failover. This technique requires different applications to use different names for the remote target storage system to avoid name conflict in/etc/hosts.

In a specific embodiment, ifgroup architecture uses a simple configuration on the storage system through CLIs, to solve the above problem. The ifgroup architecture applied to replication path can perform the following: redirect a hostname resolved IP away from the public IP—uses another private storage system IP, identify an ifgroup group based on configured selection criteria—single ifgroup where all the interfaces will be reachable to remote storage system, select a private network interface from a list of interfaces belonging to a group—ensure interface is healthy, provide load balancing across the interfaces of the ifgroup group, provide a failover interface for recovery from the interfaces of the ifgroup group.

Other issues addressed by the ifgroup mechanism include network redirection, in which VLANs are commonly used to avoid adding static routes in client as well as security. System administrators usually do not want to touch client configuration since IT teams do not allow it. There is thus a need to re-direct the backup/recovery to a private network on the correct VLAN, as customer data should not be on a public network. Embodiments include a public IP range for group selection, direct connect to ifgroup used for ifgroup selection, and a mechanism to force renegotiate of ifgroup on double error, when both ifgroup and alternate IP fail. When a service provider needs to separate the network for replication for each of their tenants, the ifgroup mechanism allows the system to utilize the directory path used by tenant on both source of replication and on target of replication to select the ifgroup group. For WAN support, there might need to by dynamic usage of multiple gateways for replication. Embodiments of the system allow two addresses to two gateways from single ifgroup by trying all connections combinations from source side to target side. For public connections, the system allows for additional public addresses by appending "-failover" (or similar) to the name of the target sever and assigning an address that utilizes the second gateway.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

For the sake of clarity, the processes and methods herein have been illustrated with a specific flow, but it should be understood that other sequences may be possible and that some may be performed in parallel, without departing from the spirit of the invention. Additionally, steps may be subdivided or combined. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for providing load balancing over multiple network addresses across a network address translation (NAT) network including a deduplicated data storage system, the method comprising:

defining an interface group that identifies a private network for one or more clients to communicate with a host over the network for read/write operations;

configuring, in a server coupled to the one or more clients, pre-NAT IP (Internet Protocol) addresses for the one or more clients using an alias internet protocol address through a unique field added to backup messages for the deduplicated data storage system for each client of the one or more clients;

adding the pre-NAT IP addresses to the interface group, wherein the interface group is established by configuring a pre-translated address of the deduplicated data storage system against a physical port of a translated IP address;

upon receiving a client hostname, returning an interface group IP address to the client that it can use it for a data transfer operation to the data storage system, wherein a client having the client hostname uses the interface group with the pre-translated IP address; and incrementing the pre-NAT IP addresses after the client starts the data transfer operation such that a least used address according to a load balancer process in the interface group is selected for the client so as to maintain load-balance across the plurality of clients.

2. The method of claim 1 wherein the NAT network assigns a plurality of network nodes to a single IP (Internet Protocol) address across the network.

3. The method of claim 2 wherein the network uses a link aggregation control protocol (LACP) to combine a plurality of physical ports together to make a single high-bandwidth data path between the client and the host and to provide load sharing of data traffic among the physical ports, and wherein each of one or more LACP IP addresses may belong to an interface group.

4. The method of claim 1 wherein the interface group distributes backup-application client connections across available links on the storage system while maintaining data-path isolation between the client and the host.

5. The method of claim 4 wherein the client connects to the host first over a public network then over the private network, or in the case of a network error, over one or more alternate private networks until all private networks are attempted, in which case access reverts to the public network.

6. The method of claim 1 wherein the load balancer process comprises:

configuring pre-NAT IP addresses for the plurality of clients and placing them in the interface group; and analyzing a destination directory path and identity of a remote source host to select an interface group of a plurality of interface groups.

7. The method of claim 6 wherein a NAT network assigns a plurality of network nodes to a single IP (Internet Protocol) address across the network, and wherein the network uses a link aggregation control protocol (LACP) to combine a plurality of physical ports together to make a single high-bandwidth data path between the client and the host and to provide load sharing of data traffic among the plurality of physical ports, and wherein one or more clients may be redirected to a resulting LACP IP address over the NAT network, and wherein a high-bandwidth data path provides increased throughput as compared to a single connection data path.

8. A system for providing load balancing over multiple network addresses across a network address translation (NAT) network including a deduplicated data storage environment, comprising:

a module defining an interface group that identifies a private network for one or more clients to communicate with a host over the network for read/write operations;

a server component configuring pre-NAT IP (Internet Protocol) addresses for the one or more clients using an alias internet protocol address through a unique field added to backup messages for the deduplicated data storage system for each client of the one or more clients, adding the pre-NAT IP addresses to the interface group, and upon receiving a client hostname, wherein the interface group is established by configuring a pre-translated address of the deduplicated data storage system against a physical port of a translated IP address, returning a n interface group IP address to the client that it can use it for a data transfer operation to the data storage system of the deduplicated data storage environment, wherein the client uses the interface group with the pre-translated IP address; and a counter component incrementing the pre-NAT IP addresses after the client starts the data transfer operation such that a least used address according to a load balancer process in the interface group is selected for the client so as to maintain load-balance across the plurality of clients.

9. The system of claim 8 wherein the NAT network assigns a plurality of network nodes to a single IP (Internet Protocol) address across the network, the system further comprising a link aggregator using a link aggregation control protocol (LACP) to combine a plurality of physical ports together to make a single high-bandwidth data path between the client and the host and to provide load sharing of data traffic among the physical ports, and wherein a high-bandwidth data path provides increased throughput as compared to a single connection data path.

10. The system of claim 9 wherein the interface group distributes backup-application client connections across available links on the storage system while maintaining data-path isolation between the client and the host.

11. The system of claim 10 wherein the client connects to the host first over a public network then over the private network, or in the case of a network error, over one or more alternate private networks until all private networks are attempted, in which case access reverts to the public network.

* * * * *